US012007040B2

United States Patent
Kuehn et al.

(10) Patent No.: US 12,007,040 B2
(45) Date of Patent: Jun. 11, 2024

(54) OVERFILL PREVENTION VALVE WITH REMOTE TESTING

(71) Applicant: Franklin Fueling Systems, LLC, Madison, WI (US)

(72) Inventors: Justin F. Kuehn, Sun Prairie, WI (US); Michael Christopherson, Monona, WI (US)

(73) Assignee: Franklin Fueling Systems, LLC, Madison, WI (US)

( * ) Notice: Subject to any disclaimer, the term of this patent is extended or adjusted under 35 U.S.C. 154(b) by 0 days.

(21) Appl. No.: 18/109,131

(22) Filed: Feb. 13, 2023

(65) Prior Publication Data

US 2023/0184350 A1      Jun. 15, 2023

Related U.S. Application Data

(60) Continuation of application No. 17/068,364, filed on Oct. 12, 2020, now Pat. No. 11,578,813, which is a continuation of application No. 16/458,968, filed on Jul. 1, 2019, now Pat. No. 10,801,640, which is a division of application No. 14/588,710, filed on Jan. 2, 2015, now Pat. No. 10,371,283.

(60) Provisional application No. 61/923,324, filed on Jan. 3, 2014.

(51) Int. Cl.
    *F16K 31/18*      (2006.01)
    *B67D 7/36*       (2010.01)
    *G01M 99/00*      (2011.01)

(52) U.S. Cl.
    CPC .............. *F16K 31/18* (2013.01); *B67D 7/365* (2013.01); *G01M 99/008* (2013.01)

(58) Field of Classification Search
    CPC ......... B67D 7/365; F16K 31/18; F16K 31/24; F16K 31/22; G01M 99/008
    See application file for complete search history.

(56) References Cited

U.S. PATENT DOCUMENTS

2013/0213480 A1 *  8/2013  Higgins .............. F16K 37/0083
                                                    137/1

FOREIGN PATENT DOCUMENTS

JP            11356072 A   * 12/1999

* cited by examiner

*Primary Examiner* — Erika J. Villaluna
(74) *Attorney, Agent, or Firm* — Faegre Drinker Biddle & Reath LLP

(57) ABSTRACT

An overfill-prevention valve system includes a testing mechanism, operable by a user from the inlet end of the drop tube, which can be used to verify proper valve function without actually filling the storage tank. The testing mechanism allows the user to actuate the valve manually using a test probe, such as by elevating a float to simulate a full storage tank. The testing mechanism may be located upstream of the valve to facilitate the testing operation without interfering with the valve body. The mechanism may further provide non-contact functionality, such as with magnetic actuators on either side of the drop tube wall, to eliminate a potential test mechanism leak points. The test probe used to actuate the test mechanism may be shaped to define a desired rotational position at the test location within the drop tube, ensuring proper rotational alignment of the magnetic actuators.

16 Claims, 15 Drawing Sheets

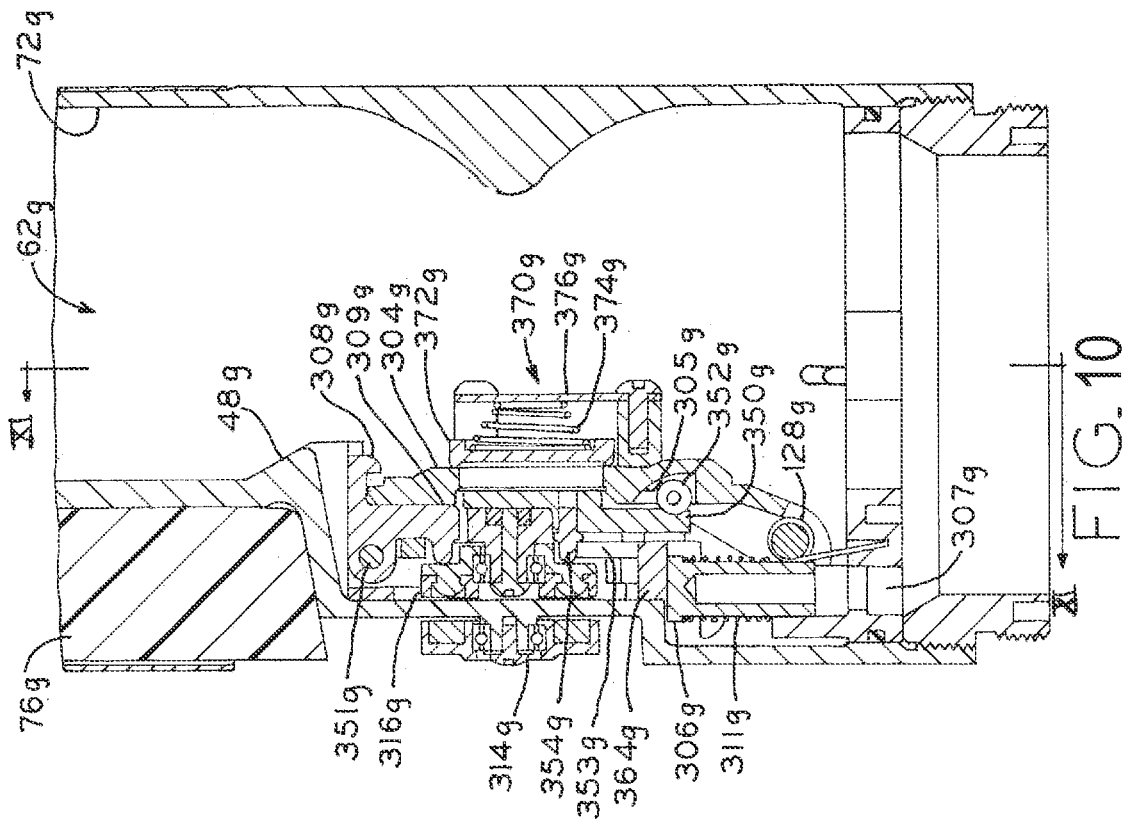
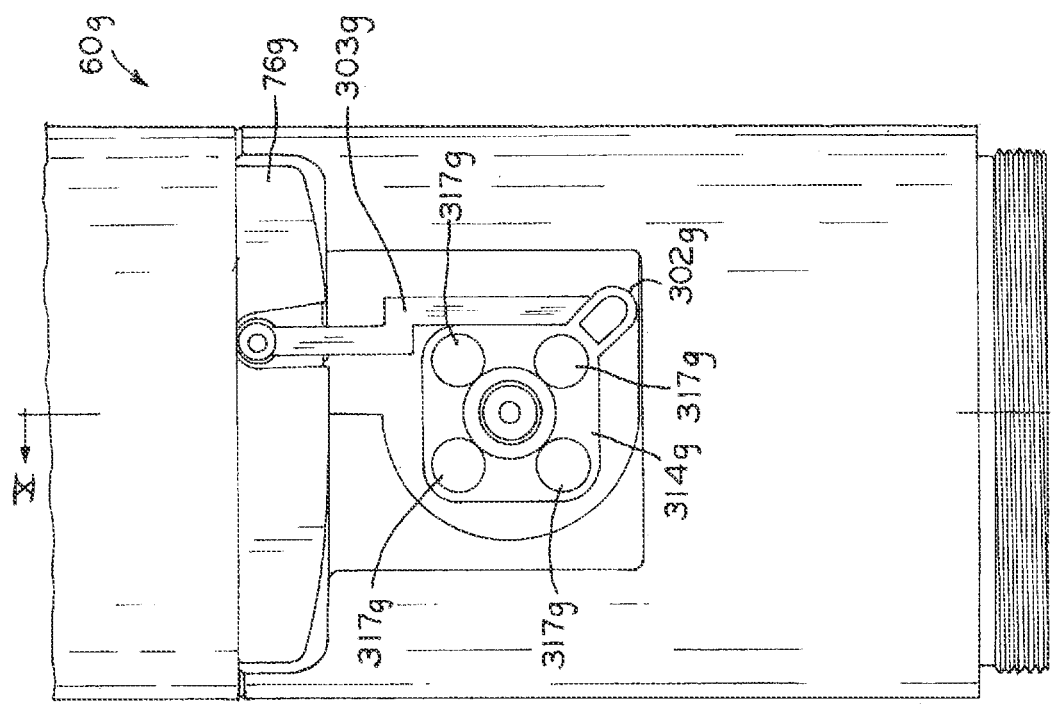

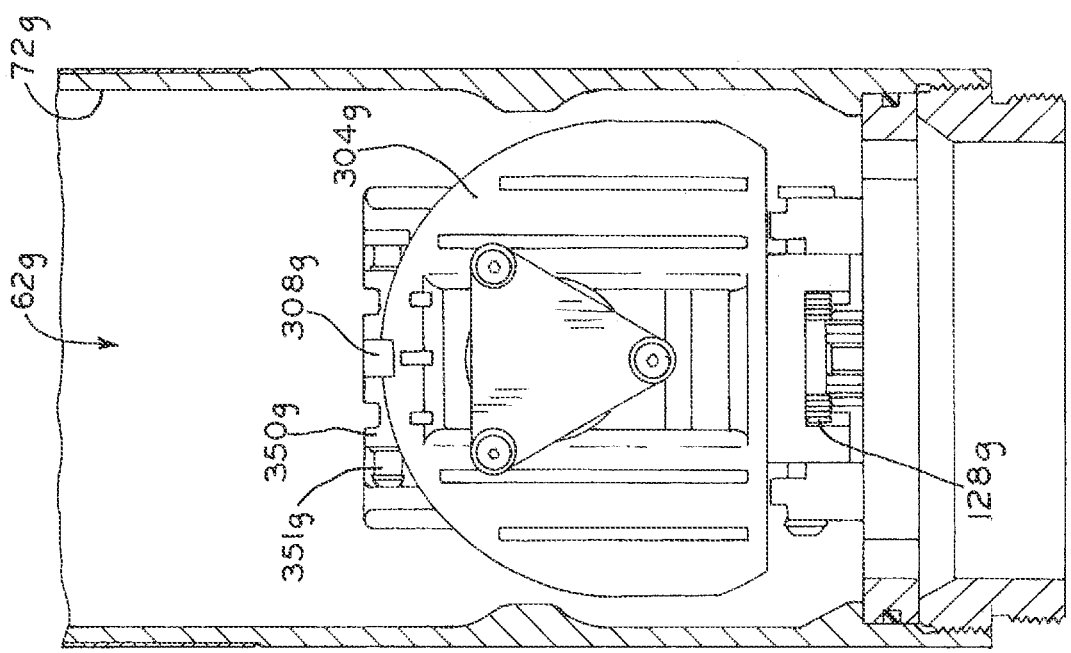

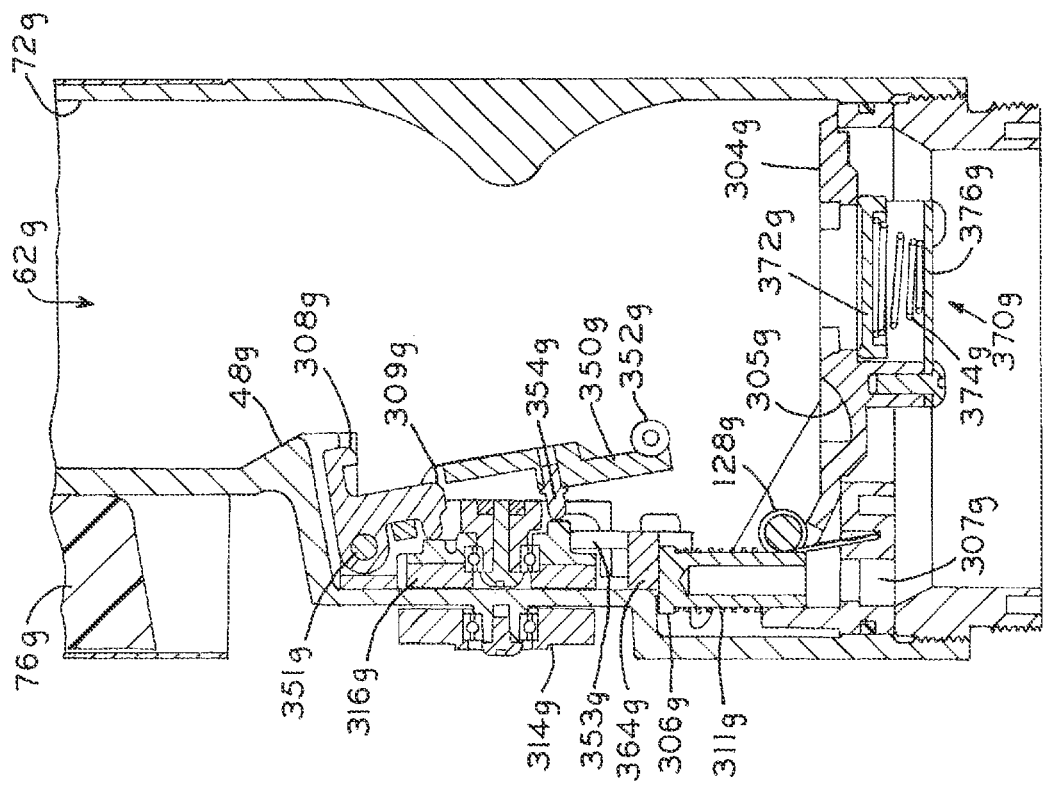

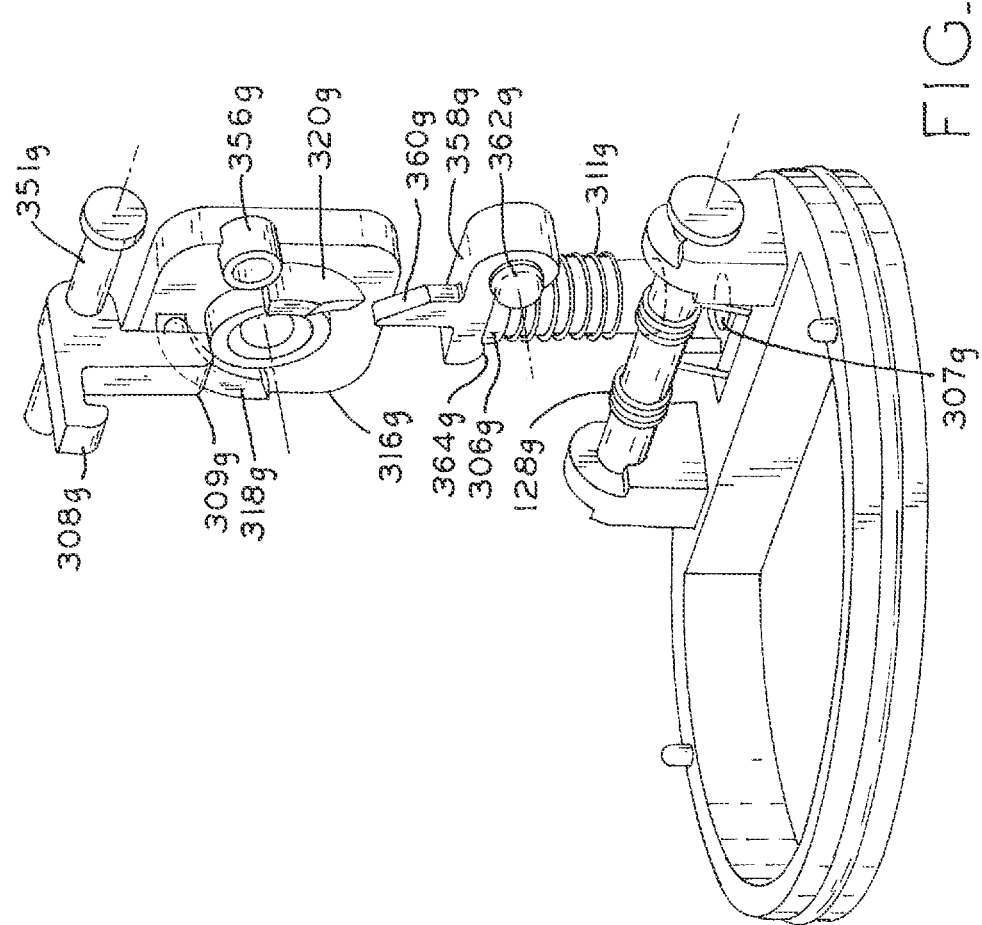

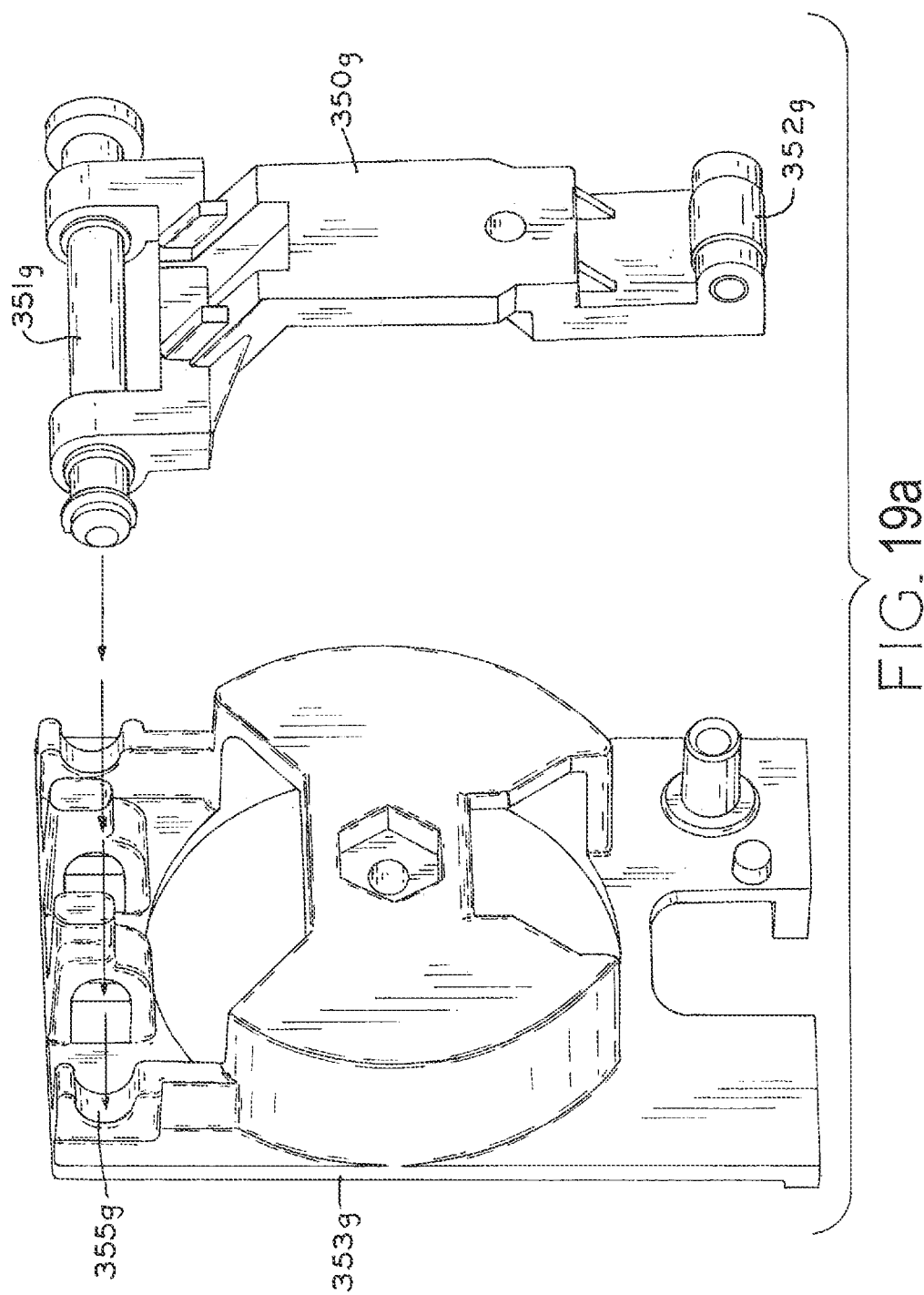

OVERFILL PREVENTION VALVE WITH REMOTE TESTING

CROSS-REFERENCE TO RELATED APPLICATIONS

This application is a continuation of U.S. patent application Ser. No. 17/068,364, filed Oct. 12, 2020 and entitled OVERFILL PREVENTION VALVE WITH REMOTE TESTING, which is a continuation of U.S. patent application Ser. No. 16/458,968, filed Jul. 1, 2019 and entitled OVERFILL PREVENTION VALVE WITH REMOTE TESTING, which is a divisional of U.S. patent application Ser. No. 14/588,710, filed Jan. 2, 2015 and entitled OVERFILL PREVENTION VALVE WITH REMOTE TESTING, which claims the benefit of U.S. Provisional Patent Application Ser. No. 61/923,324, filed Jan. 3, 2014 and entitled OVERFILL PREVENTION VALVE WITH REMOTE TESTING, the entire disclosures of which are all hereby expressly incorporated herein by reference.

BACKGROUND

1. Technical Field

The present disclosure relates to drop tube segments and, more particularly, to drop tube segments providing selective access to a fluid reservoir.

2. Description of the Related Art

Underground storage tanks are routinely utilized to store fuels such as gasoline, diesel fuel, ethanol, etc. for later dispensing to vehicles through fuel dispensers. The underground storage tank contains an inlet through which fuel is provided to the underground storage tank, typically by a tanker truck. A plurality of fuel dispensers are also fluidly connected to the underground storage tank and are utilized to provide the fuel contained therein to, e.g., passenger vehicles.

Typically, a riser pipe extends upwardly from the underground storage tank to a fill connection point contained within a sump at the fueling station. Within the riser pipe, a drop tube extends downwardly into the volume of the underground storage tank.

The drop tube extends toward the bottom of the underground storage tank so that the outlet end of the drop tube is covered by the motor fuel or other liquid contained in the underground storage tank. Therefore, the drop tube is not in fluid communication with the fuel vapor contained in the ullage area of the underground storage tank. However, the overfill prevention valve is typically positioned much closer to the top of the underground storage tank and is therefore typically in fluid communication with the vapor contained in the ullage area of the underground storage tank.

When filling an underground storage tank, the operator of a tanker truck must be careful not to overfill the underground storage tank. To this end, an overfill prevention valve may be utilized to prevent overfilling of the underground storage tank. For example, an overfill prevention valve may utilize a float which is buoyant on a surface of a quantity of motor fuel and which is connected by a linkage to a valve positioned within a segment of a drop tube connecting a fill point to the underground storage tank. The linkage extends through the wall of the drop tube so that it can mechanically connect the float, which is outside of the drop tube, to the valve body, which is inside the drop tube. When the float rises to a "filled" position as the fuel level approaches the top the tank, the linkage causes the valve to close. When closed, incoming fuel quickly builds up above the valve in the drop tube, causing the operator to stop the flow of fuel.

Because the overfill prevention valves of prior art devices include a mechanical linkage connecting a float positioned on the exterior of the drop tube with a valve body positioned on the interior of the drop tube, the wall of the drop tube segment containing the overfill prevention valve must be physically penetrated by the linkage to allow for such a connection. This physical penetration of the wall of the drop tube segment containing the overfill prevention valve creates a leak point where vapor contained in the ullage space of the underground storage tank can enter into the drop tube. It is desirable to prevent vapor contained in the ullage space of the underground storage tank from entering into the interior of the drop tube where it could potentially be vented to the atmosphere.

In order to verify that the overfill prevention valve is working properly, it may be desirable to include a testing functionality whereby the valve can be actuated selectively, without the need for an actual overfill condition.

SUMMARY

The present disclosure provides an overfill-prevention valve system including a testing mechanism, operable by a user from the inlet end of the drop tube, which can be used to verify proper valve function without actually filling the storage tank. The testing mechanism allows the user to actuate the valve manually using a test probe, such as by elevating a float to simulate a full storage tank. In one embodiment, the testing mechanism may be located upstream of the valve to facilitate the testing operation without interfering with the valve body. In another embodiment, the mechanism may further provide non-contact functionality, such as with magnetic actuators on either side of the drop tube wall, to eliminate potential test mechanism leak points. The test probe used to actuate the test mechanism may be shaped to define a desired rotational position at the test location within the drop tube, ensuring proper rotational alignment of the magnetic actuators.

In one form thereof, the present disclosure provides an overfill prevention system comprising: a conduit having a conduit wall extending from an inlet end to an outlet end, the conduit wall defining a conduit wall interior surface and a conduit wall exterior surface, the conduit wall interior surface defining a fluid path through the conduit from the inlet end to the outlet end; a valve body moveably positioned in the fluid path of the conduit, the valve body actuatable from an open position to a closed position; a valve actuator moveable relative to the valve body between an overfill-prevention position and a filling position, the valve actuator urging the valve body toward the closed position when the valve actuator moves from the filling position to the overfill-prevention position, and the valve actuator permitting the valve body to be in the open position when the valve actuator is in the filling position; and a non-contact test mechanism selectively coupled to the valve actuator and moveable between a service position and a test position, the non-contact test mechanism decoupled from the valve actuator when the non-contact test mechanism is in the service position, such that the valve actuator is moveable with respect to the non-contact test mechanism when the valve actuator moves between the overfill-prevention position and the filling position, the non-contact test mechanism engaging the valve actuator in the test position, such that actuation of the non-contact test mechanism from the service position to the test position advances the valve actuator from the filling position to the overfill-prevention position, whereby the actuation of the non-contact test mechanism urges the valve body toward the closed position without the presence of an overfill condition, and the non-contact test mechanism positioned outside of the conduit such that the conduit wall is interposed between the non-contact test mechanism and the fluid path, the non-contact test mechanism operable to actuate the valve actuator from the filling position to the overfill-prevention position without physically penetrating the conduit wall, whereby the non-contact test mechanism does not require creation of a leak path in the conduit in order to function as a test mechanism.

In another form thereof, the present disclosure provides an overfill prevention mechanism comprising: a conduit having a conduit wall extending from an inlet end to an outlet end, the conduit wall defining a conduit wall interior surface and a conduit wall exterior surface, the conduit wall interior surface defining a fluid path through the conduit starting at an upstream location at the inlet end and ending at a downstream location at the outlet end; a valve body moveably positioned in the fluid path of the conduit, the valve body actuatable from an open position to a closed position; a valve actuator moveable relative to the valve body between an overfill-prevention position and a filling position, the valve actuator urging the valve body toward the closed position when the valve actuator moves from the filling position to the overfill-prevention position, and the valve actuator permitting the valve body to be in the open position when the valve actuator is in the filling position; and a non-contact test mechanism disposed upstream of the valve body and moveable between a service position and a test position, the non-contact test mechanism comprising: a test actuator coupled to the valve actuator such that actuation of the non-contact test mechanism from the service position to the test position advances the valve actuator from the filling position to the overfill-prevention position, whereby the actuation of the non-contact test mechanism urges the valve body toward the closed position without the presence of an overfill condition, and the non-contact test mechanism positioned outside of the conduit such that the conduit wall is interposed between the test actuator and the fluid path, the test actuator operable to advance the valve actuator from the filling position to the overfill-prevention position without physically penetrating the conduit wall, whereby the non-contact test mechanism does not require creation of a leak path in the conduit in order to function as a test mechanism.

In yet another form thereof, the present disclosure provides an overfill prevention system comprising: a conduit having a conduit wall extending from an inlet end to an outlet end, the conduit wall defining a conduit wall interior surface and a conduit wall exterior surface, the conduit wall interior surface defining a fluid path through the conduit starting at an upstream location at the inlet end and ending at a downstream location at the outlet end; a valve body moveably positioned in the fluid path of the conduit, the valve body actuatable from an open position to a closed position; a valve actuator moveable relative to the valve body between an overfill-prevention position and a filling position, the valve actuator urging the valve body toward the closed position when the valve actuator moves from the filling position to the overfill-prevention position, and the valve actuator permitting the valve body to be in the open position when the valve actuator is in the filling position; and a non-contact test mechanism moveable between a service position and a test position, the non-contact test mechanism comprising: a test actuator coupled to the valve actuator and positioned outside of the conduit such that the conduit wall is interposed between the test actuator and the fluid path, actuation of the non-contact test mechanism from the service position to the test position advancing the valve actuator from the filling position to the overfill-prevention position, whereby the actuation of the non-contact test mechanism urges the valve body toward the closed position without the presence of an overfill condition; and an exterior non-contact coupler adjacent the conduit wall and selectively coupled to the test actuator; and a test probe comprising: a proximal portion manipulable by an operator at the inlet end of the conduit; a distal portion receivable within the conduit such that the distal portion is positioned adjacent to the non-contact test mechanism; an interior non-contact coupler in force transferring relationship with the exterior non-contact coupler when the distal portion is adjacent to the non-contact test mechanism, the interior non-contact coupler moveable with respect to the distal portion from the service position, in which the interior and exterior non-contact couplers cooperate to allow the test actuator to be placed into the filling position, to the test position, in which the interior and exterior non-contact couplers cooperate to move the test actuator into the overfill-prevention position, whereby the distal portion may remain stationary within the conduit while the interior non-contact coupler is manipulated to toggle the valve body toward or away from the closed position.

In still another form thereof, the present disclosure provides a method of testing an overfill prevention valve, the method comprising: accessing an inlet end of a conduit, the conduit having an outlet end opposite the inlet end and a valve disposed between the inlet end and the outlet end, the conduit having test portion defining a non-round cross-sectional conduit geometry; advancing a distal portion of a test probe into the conduit, the distal portion having a non-round cross-sectional probe geometry corresponding to the conduit geometry; positioning the distal portion of the test probe into the test portion of the conduit by aligning the distal portion probe geometry with the corresponding conduit geometry; by the step of positioning the distal portion of the test probe, bringing an interior non-contact coupler fixed to the distal portion of the test probe into a force transferring relationship with an exterior non-contact coupler fixed to a non-contact test mechanism disposed outside the conduit and operably coupled to the valve, the non-contact test mechanism axially moveable along an outer surface of the conduit between a test position, in which the non-contact test mechanism urges the valve toward a closed position, and a service position, in which the non-contact test mechanism allows the valve to be placed in an open position; and axially moving the interior non-contact coupler to toggle the non-contact test mechanism between the test position and the service position, such that the valve is selectively moved toward the closed or open positions.

Any of the features described in the various embodiments described in the present disclosure are contemplated for use with any of the other features and embodiments, including valve arrangements (both described herein and incorporated by reference), non-contact actuator structures, testing probe structures and drop tube adapter structures. More particularly, it is contemplated that any of these various features may be combined to form a drop tube segment useable with a fuel storage tank in accordance with the present disclosure.

BRIEF DESCRIPTION OF THE DRAWINGS

The above-mentioned and other features of the disclosure, and the manner of attaining them, will become more apparent and will be better understood by reference to the following description of embodiments of the disclosure taken in conjunction with the accompanying drawings, wherein:

FIG. 9 is a partial radial elevational view of an alternative embodiment drop tube segment having a non-contact valve of the present disclosure;

FIG. 10 is a sectional view of the drop tube segment illustrated in FIG. 9, taken along line X-X of FIG. 9;

FIG. 11 is a sectional view of the drop tube segment illustrated in FIGS. 9 and 10, taken along line XI-XI of FIG. 10;

FIG. 16 is a sectional view of the drop tube segment illustrated in FIG. 9, taken along line XV-XV of FIG. 14 and illustrating the valve body in the closed position and the closure stop in the leak position;

FIG. 19 is a perspective view of the inner magnetic coupler and closure stop and certain associated structure;

FIG. 19a is an exploded, perspective view of the pivoting bracket the bracket support of the present disclosure.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 1:
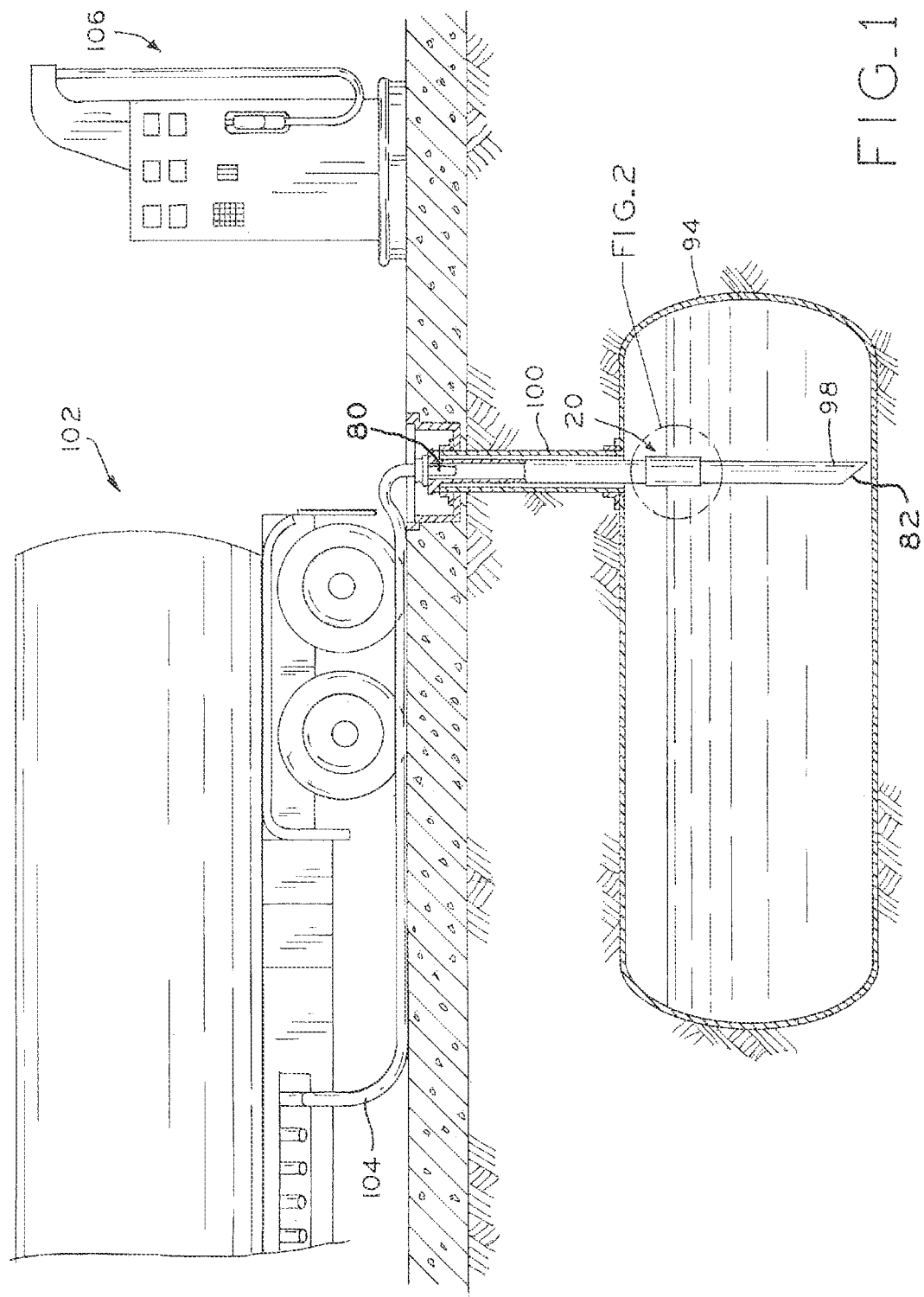
FIG. 1 is a representation of a fueling station showing a tanker truck filling an underground storage tank.

FIG. 1 illustrates an exemplary utilization of drop tube segment 20 in the context of a fueling station. As illustrated in FIG. 1, a fueling station may include underground storage tank 94 having riser pipe 100 extending upwardly therefrom and drop tube 98 extending through riser pipe 100 and into the storage space of underground storage tank 94. Tanker truck 102 can be fluidly connected to underground storage tank 94 by fill hose 104 so that the contents of tanker truck 102 can be deposited in underground storage tank 94. Drop tube segment 20 of the present disclosure can be utilized as described in detail below to limit the amount of fuel deposited by tanker truck 102 into underground storage tank 94. The contents of underground storage tank 94 can then be accessed by fuel dispenser 106 for dispensing to end users in, e.g., passenger vehicles and the like.

The remainder of this detailed description will describe use of the overfill prevention valve of the present disclosure with respect to a fueling station; however, use of the drop tube segments of the present disclosure are not limited to fueling station installations. The overfill prevention valve of the present disclosure is generally useable in connection with any fluid reservoir into which a drop tube extends.

Throughout the description of the embodiments of the present disclosure, similar numeric and/or alphanumeric reference signs may be used to denote similar parts (e.g., reference numerals having identical numeric designations, but different alphabetic designations such as 52, 52a, 52b). Without regard to whether similar reference signs are used to denote similar parts across the various embodiments, the present disclosure contemplates the interchangeable use of different features and/or parts from multiple embodiments to create a construct within the scope of the present disclosure.

1. Overfill Prevention Valve

Figure 3:
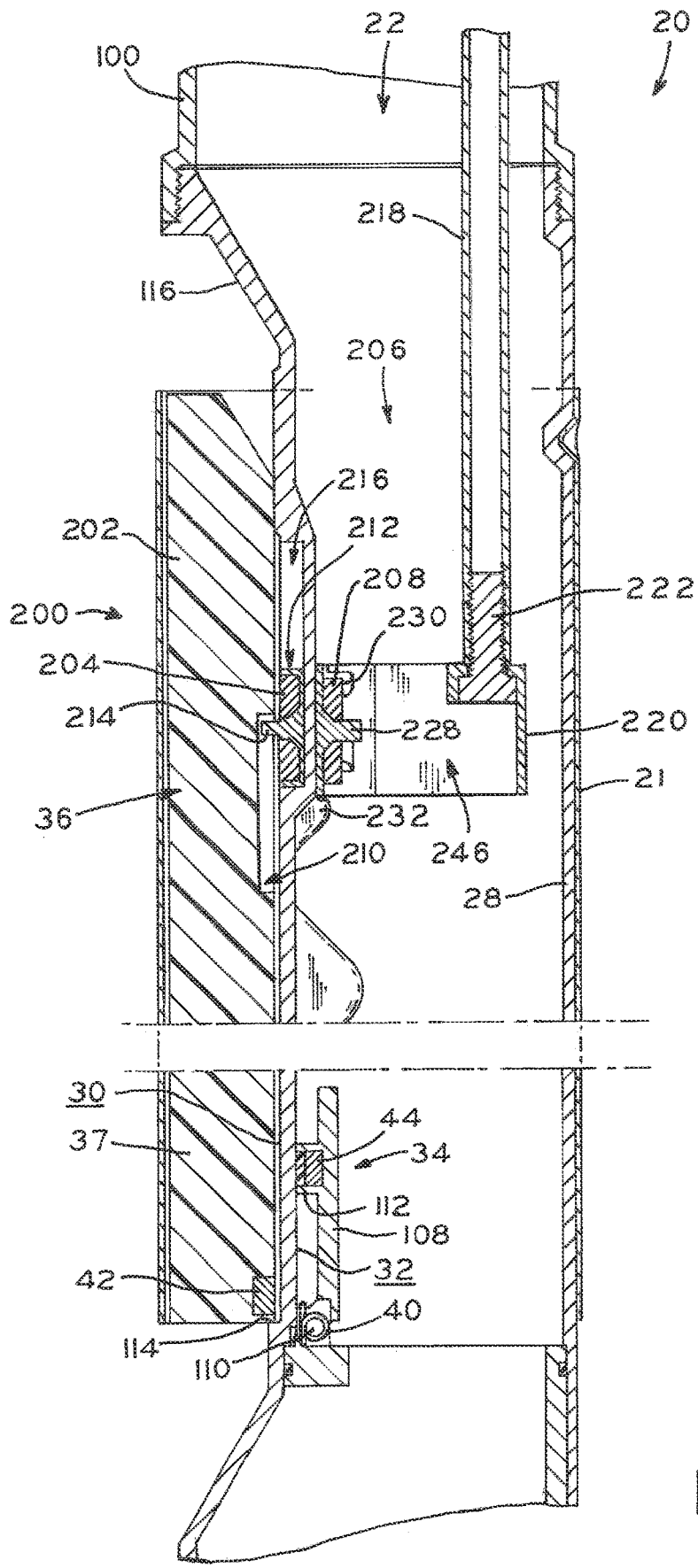
FIG. 3 is a partial cross-section, elevation view of a drop tube segment including the test mechanism of FIG. 2, in which an overfill valve float is in a lowered position, the testing mechanism is not actuated and the overfill prevention valve is open.
Figure 4:
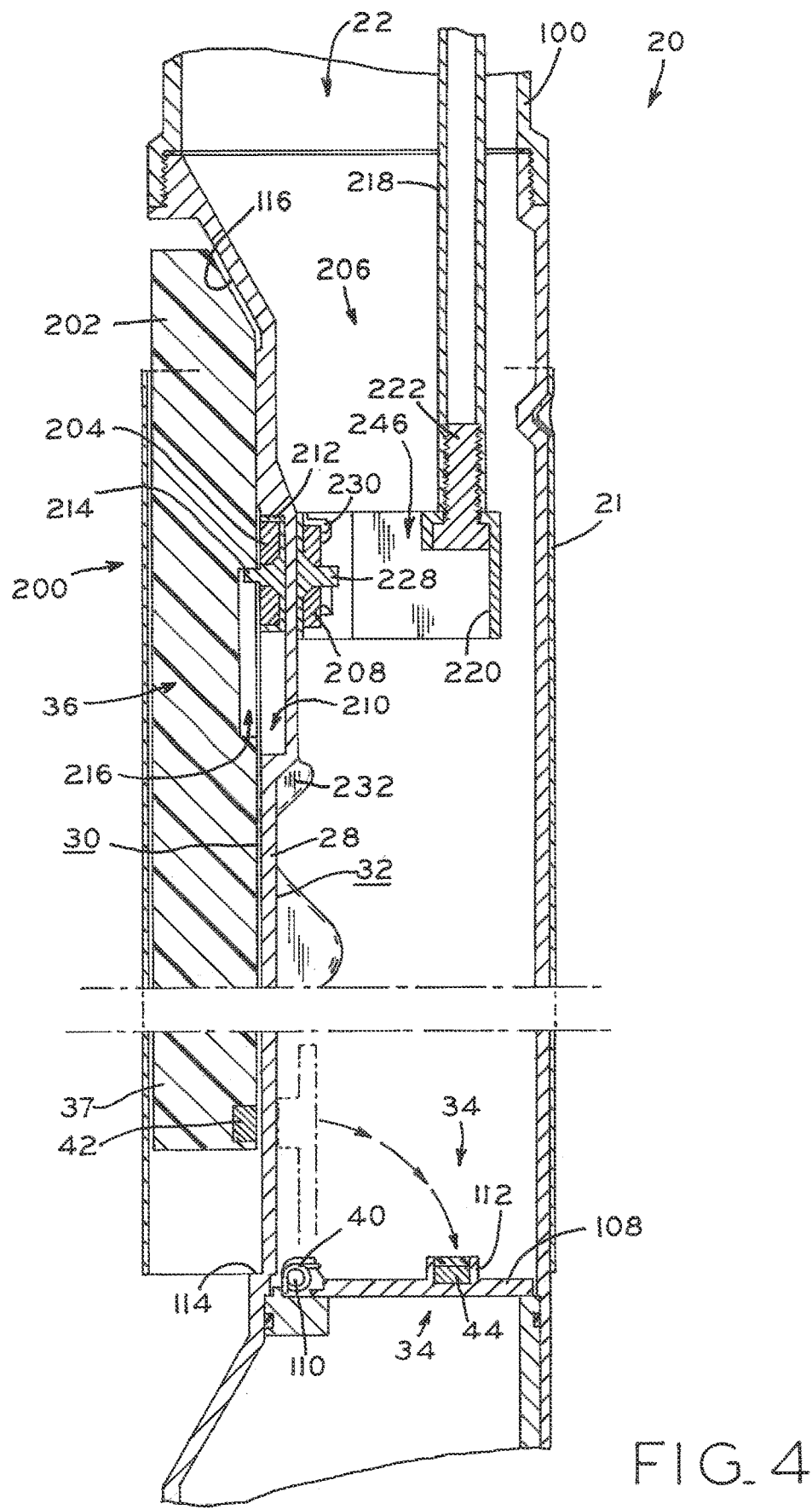
FIG. 4 is a partial cross-section, elevation view of a drop tube segment of FIG. 3, in which the testing mechanism has been actuated to raise the overfill valve float to the overfill-prevention position, closing the overfill prevention valve.
Figure 5:
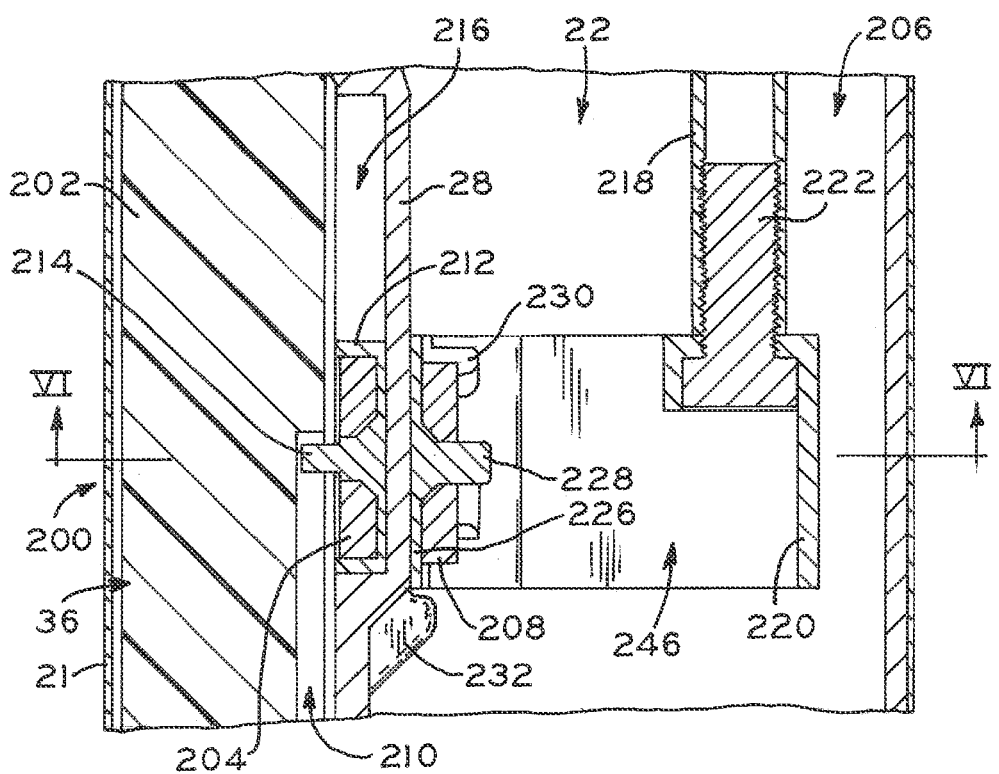
FIG. 5 is a partial cross-section, elevation view of a portion of the drop tube segment of FIG. 3, illustrating the distal end of a test probe in the fully lowered position.

Turning now to FIGS. 3 and 4, overfill prevention valve 34 (OPV) is illustrated in open and closed positions, respectively. Valve 34 includes valve body 108 pivotally connected to conduit wall 28 via pivot 110, as further described below. Valve 34 cooperates with test mechanism 200 to provide valve testing functionality, as also described in further detail below. For clarity in FIGS. 3-8, valve 34 is schematically illustrated with minimal additional detail, it being understood that other valve arrangements may be used in accordance with the present disclosure as required or desired for a particular application.

Exemplary non-contact valve arrangements usable with the present test mechanism are described in U.S. patent application Ser. No. 14/026,308 and International Application No. PCT/US13/57884, filed Sep. 13, 2013 and Sep. 3, 2013 respectively, entitled OVERFILL PREVENTION VALVE and DROP TUBE SEGMENT respectively, both of which are commonly owned with the present application, the entire disclosures of which are hereby expressly incorporated herein by reference. One particular exemplary non-contact valve assembly is show in the context of drop tube segment 60g, shown in FIGS. 9-21 and described in detail below. In addition, it is contemplated that contact-type OPVs may be used in conjunction with test mechanism 200, i.e., an OPV which extends through conduit wall 28 to actuate valve 34 may be linked to test mechanism 200 in a similar fashion as described herein.

FIG. 4 illustrates the closed configuration of valve 34, in which little or no flow can pass valve body 108. On the other hand, when valve 34 is in the open position illustrated in FIG. 3, conduit 22 is sufficiently open to allow passage of fuel at a normal fill rate. For applications in exemplary fuel storage configurations, this fill rate is generally in the range of 300-500 gallons per minute (gpm). In certain embodiments, the maximum rated flow past valve 34 in its open position is 400-450 gpm. In alternative configurations, the flow rate will be about 370 gpm. In applications with remote filling capability, the standard flow rate may be as low as 25 gpm. These flow rates are applicable to all of the embodiments described in this document.

With valve 34 in the open position as illustrated in FIG. 3, the maximum fill rate is accommodated by conduit 22. In the closed position illustrated in FIG. 4, the maximum fill rate is not allowed and, if filling at such a rate continues, the portion of drop tube 98 upstream of valve 34 begins to fill with a column of fluid. The actuation mechanism which causes valve 34 to move from the open position illustrated in FIG. 3 to the closed position illustrated in FIG. 4 (which will be described in more detail hereinbelow) causes rapid closing of valve 34, causing the fluid column upstream of valve 34 to produce a line shock which will cause fill hose 104 to jump, which is typically referred to as "hose kick" in the fueling industry. Hose kick alerts the driver to close the delivery valve on the delivery truck 102 and discontinue filling the fuel tank 94.

Referring still to FIGS. 3 and 4, basic functional details of an overflow prevention valve 34 in accordance with the present disclosure will now be described. As noted above, valve body 108 is pivotally connected relative to drop tube segment 20. In an exemplary embodiment, valve body 108 may be pivotally connected at pivot 110 by a rod connected to conduit wall interior surface 32 and spanning conduit 22 of drop tube segment 20. Valve body 108 is biased into the open position (FIG. 3) by a biasing element, e.g., torsion spring 40. Magnet carriage 112 extends from valve body 108 and carries valve body magnet 44. When underground storage tank 94 is filled to less than its capacity, tanker truck 102 can be utilized to provide additional motor fuel to underground storage tank 94. As underground storage tank 94 nears capacity, non-contact valve actuator 37 is advanced upwardly to actuate valve 34 from the open position illustrated in FIG. 3 toward the closed position illustrated in FIG. 4.

Drop tube segment 20 includes non-contact valve actuator 37 positioned adjacent conduit wall exterior surface 30, with conduit wall 28 interposed between and physically separating non-contact valve actuator 37 from valve body 108. As will be described hereinbelow, non-contact valve actuator 37 is capable of actuating valve 34 from the open position (illustrated in FIG. 3) toward a closed position (such as the one illustrated in FIG. 4) without physically penetrating conduit wall 28. In the exemplary embodiment illustrated in FIGS. 3 and 4, non-contact valve actuator 37 is a portion of float 36 (the other portion being test actuator 202 as further described below), which is formed as an elongate wedge sized to fit next to conduit wall exterior surface 30 such that conduit wall 28 and float 36 together form a generally cylindrical structure sized to fit within a correspondingly cylindrical splash shield 21 as illustrated. Non-contact valve actuator 37 rests against lower stop 114 to define a lower limit of axial travel, i.e., when the upper level of the fuel contained in underground storage tank 94 is positioned below float 36. Upward travel of non-contact valve actuator 37 may similarly define an upper limit by, e.g., upper stop 116.

As noted above, non-contact valve actuator 37 comprises a portion of float 36, which has buoyancy characteristics to render it buoyant on the upper surface of a fluid. In one exemplary embodiment, float 36 has a specific gravity less than 0.7 so that it is buoyant on a surface of a quantity of motor fuel. When the liquid level in underground storage tank 94 is below a threshold level, float 36 remains out of contact with the fluid and rests in its lowered position under the weight of gravity. As the liquid level in underground storage tank 94 rises, the top surface of fuel contained in underground storage tank 94 rises to encounter float 36. In one exemplary embodiment, when underground storage tank 94 achieves a liquid level corresponding to underground storage tank 94 being about 90% full, float 36 is engaged with (and becomes partially immersed in) the upper fuel surface, causing float 36 to advance axially upwardly until valve actuator magnet 42 becomes aligned with valve body magnet 44 (FIG. 4). Magnets 42, 44 have the same polarity, and so repel one another such that valve actuator magnet 42 repels valve body magnet 44 to actuate valve 34 from the open position (FIG. 3) toward the closed position illustrated (FIG. 4).

As float 36 rises and brings valve actuator magnet 42 into alignment with valve body magnet 44, the resulting repellant force causes valve body 108 to rotate against the biasing force of spring 40 from the open position illustrated in FIG. 3 to an intermediate, partially-lowered position. In this partially-lowered position, a downstream flow of fluid (i.e., from inlet 80 to outlet 82 as shown in FIG. 1) passing through conduit 22 impacts the upper surface of valve body 108, causing valve body 108 to move into the closed position against the biasing force of torsion spring 40. As described above, when valve body 108 maintains the closed position illustrated in FIG. 4, the maximum fill rate associated with underground storage tank 94 can no longer pass valve 34. Further, the weight of the column of fluid contained in the portion of drop tube 98 upstream from valve 34 holds valve body 108 in the closed position.

When filling is halted after the closure of valve 34, the column of fluid upstream of valve 34 may slowly drain out of conduit 22 by provision of a leak mechanism which allows fluid to slowly drain past the closed valve 34, such that the weight of the fluid column upstream of valve 34 is gradually reduced and valve body 108 is eventually returned to an intermediate or open position by the biasing force of torsion spring 40 (FIG. 3). Exemplary leak mechanisms are described in U.S. patent application Ser. No. 14/026,308 and International Application No. PCT/US13/57884, filed Sep. 13, 2013 and Sep. 3, 2013 respectively, entitled OVERFILL PREVENTION VALVE and DROP TUBE SEGMENT respective, both of which are commonly owned with the present application, the entire disclosures of which are hereby expressly incorporated herein by reference. As fuel is drawn out of underground storage tank 94 (e.g., by fuel dispenser 106), the volume of fluid in storage tank 94 becomes low enough to allow float 36 to move back down toward its lowered position, thereby carrying magnet 42 out of alignment with magnet 44 to allow valve body 108 to move to its fully open position (FIG. 3). If the fluid level stays high and magnets 42, 44 remain aligned, valve body 108 will remain in the intermediate position, ready to close once again if any new fluid is delivered at inlet 80.

2. Test Mechanism

The present disclosure provides test mechanism 200, shown in FIGS. 2-8, operable to actuate non-contact valve actuator 37 without actually filling underground storage tank 94 to a level sufficient to raise float 36. As described in further detail below, test mechanism 200 can be used by an operator stationed at inlet 80 of conduit 22 to bring magnets 42, 44 into alignment with one another (e.g., to test the function of valve 34) without initiating a flow of fluid through conduit 22. Non-contact test mechanism 200 may be provided in conjunction with drop tube segment 20 to allow for such a remote test actuation of valve 34 without the necessity to completely fill underground storage tank 94.

Turning again to FIG. 3, test mechanism 200 includes test actuator 202 and exterior non-contact coupler 204 (e.g. a magnet) selectively engageable with test actuator 202 as described below. In addition, the testing system includes test probe 206 having interior non-contact coupler 208 (e.g., a second magnet having an opposite polarity to the exterior magnet 204) attached to a distal actuation bracket 220. Test probe 206 may be advanced along a downstream direction into conduit 22 from inlet 80 to bring interior coupler 208 into force transferring alignment with exterior coupler 204, such that movement of test probe 206 is transferred to test actuator 202. The operator can then lift interior magnet 208 (e.g., by lifting test probe 206 or actuating a magnet mechanism as described below) to lift float 36. As described above in the context of overfill prevention functionality, this raising of float 36 reconfigures non-contact valve actuator 37 from its regular filling position (in which valve 34 is allowed to remain open) to its overfill prevention position (in which valve 34 is moved toward its closed configuration).

Figure 2:
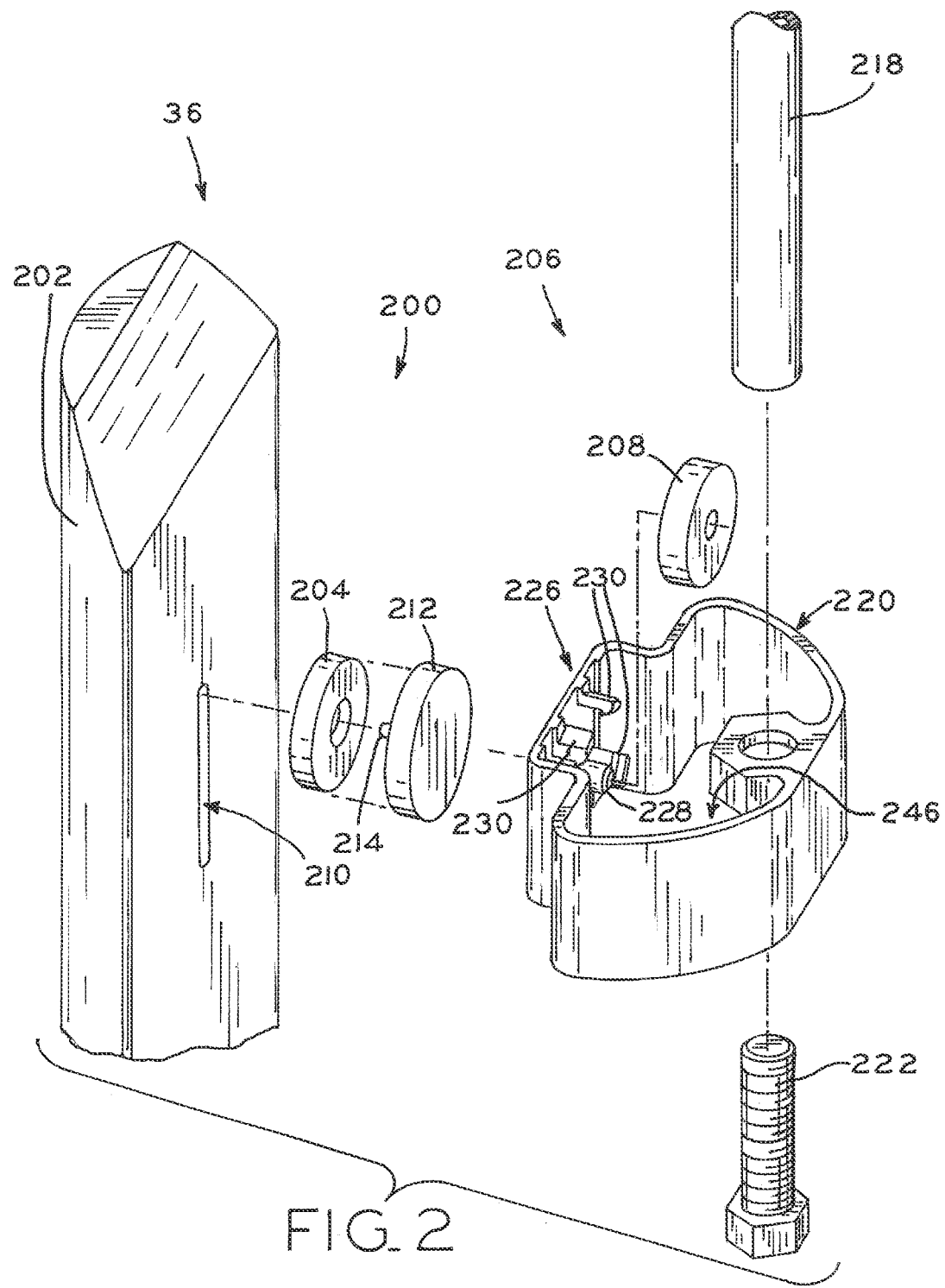
FIG. 2 is a perspective, exploded view of test mechanism in accordance with the present disclosure.

FIG. 2 illustrates an exploded view of components of test mechanism 200, in which conduit wall 28, splash shield 21 and riser pipe 100 shown in FIG. 3 have been removed to show the internal components more clearly. As illustrated, test actuator 202 comprises the upper portion of float 36, with valve actuator 37 (FIGS. 3 and 4) comprising the lower portion of float 36. In an exemplary embodiment, non-contact valve actuator 37 (FIGS. 3 and 4) and test actuator 202 are monolithically formed as a single part having, in the aggregate, a desired buoyancy. For example, the density of float 36 may be controlled to provide a specific gravity of, e.g., 0.7. In a particular exemplary embodiment, float 36 may have a substantially uniform density throughout its material, so that its buoyancy when floating in motor fuel in storage tank 94 results in reliable and predictable actuation of valve 34 as float 36 advances from its lower position (FIG. 3) to its upper position (FIG. 4).

However, it is contemplated that in some embodiments, test actuator 202 and valve actuator 37 may be separate components, and/or may have differing density characteristics, as required or desired for a particular application. Moreover, it is contemplated that test mechanism 200 may take alternate forms within the scope of the present disclosure, in which the mechanism is selectively decoupled from valve actuator 37 to either allow for normal operation of the overfill prevention valve or to compel actuation of the overfill prevention valve as needed. In the illustrated embodiment, for example, test mechanism 200 is functionally decoupled from valve actuator 37 when exterior magnet 204 is in its lowered "service" position, because float 36 is allowed to move freely between its service and overfill-prevention positions without interference from test mechanism 200. On the other hand, when exterior magnet 204 is in its raised "test" position, test mechanism 200 is functionally coupled to valve actuator 37 because float 36 is constrained from movement away from its raised, overfill-prevention position. In other embodiments, alternative linkage arrangements may be used to achieve the functional coupling and decoupling.

Test actuator 202 has a groove or slot 210 formed along the substantially planar inner surface of float 36 as illustrated. Float slot 210 is sized to slidingly receive protrusion 214 of magnet carriage 212 (FIG. 3), such that test actuator 202 may move through a defined range of motion with respect to exterior magnet 204, as described in further detail below. As best seen in FIG. 3, magnet 204 is received within and fixed to magnet carriage 212 such that protrusion 214 protrudes outwardly from the periphery of magnet 204, such that magnet 204 is also moveable with respect to float 36 through the defined range of motion.

As best seen in FIG. 3, magnet 204 and carriage 212 are themselves received within longitudinal slot 216 formed in exterior surface 30 of conduit wall 28. Wall slot 216 functions as a track, and allows magnet 204 and carriage 212 to slide along upstream and downstream directions through a defined range of motion (i.e., along a path substantially parallel to the longitudinal axis of drop tube segment 20), but not to have substantial freedom of movement in the lateral direction. The range of motion and associated range of vertical positions afforded by wall slot 216 for magnet 204 (and for protrusion 214) facilitates the lifting of float 36 upwardly from its lowered position via magnet 204 and carriage 212, as described in further detail below, but does not interfere with the normal up and down movement of float 36 arising from fluid/float interaction during fluid filling and storage operations. More particularly, positioning magnet 204 and carriage 212 at their lowered "service" positions at the bottom of wall slot 216 also places protrusion 214 at the top of float slot 210 when float 36 is at the downward end of its range of travel. Raising float 36 from its lower position during service of drop tube 20 (e.g., by filling storage tank 94) is therefore unimpeded by test mechanism 200, because such upward movement of float 36 will merely cause protrusion 214 to travel freely within float slot 210. On the other hand, repositioning magnet 204 and carriage 212 at the top of wall slot 216 causes protrusion 214 to constrain float 36 to the raised (i.e., overfill prevention) position because this positions protrusion 214 at the top of float slot 210 of float 36 when float 36 is at the top of its stroke.

Figure 6:
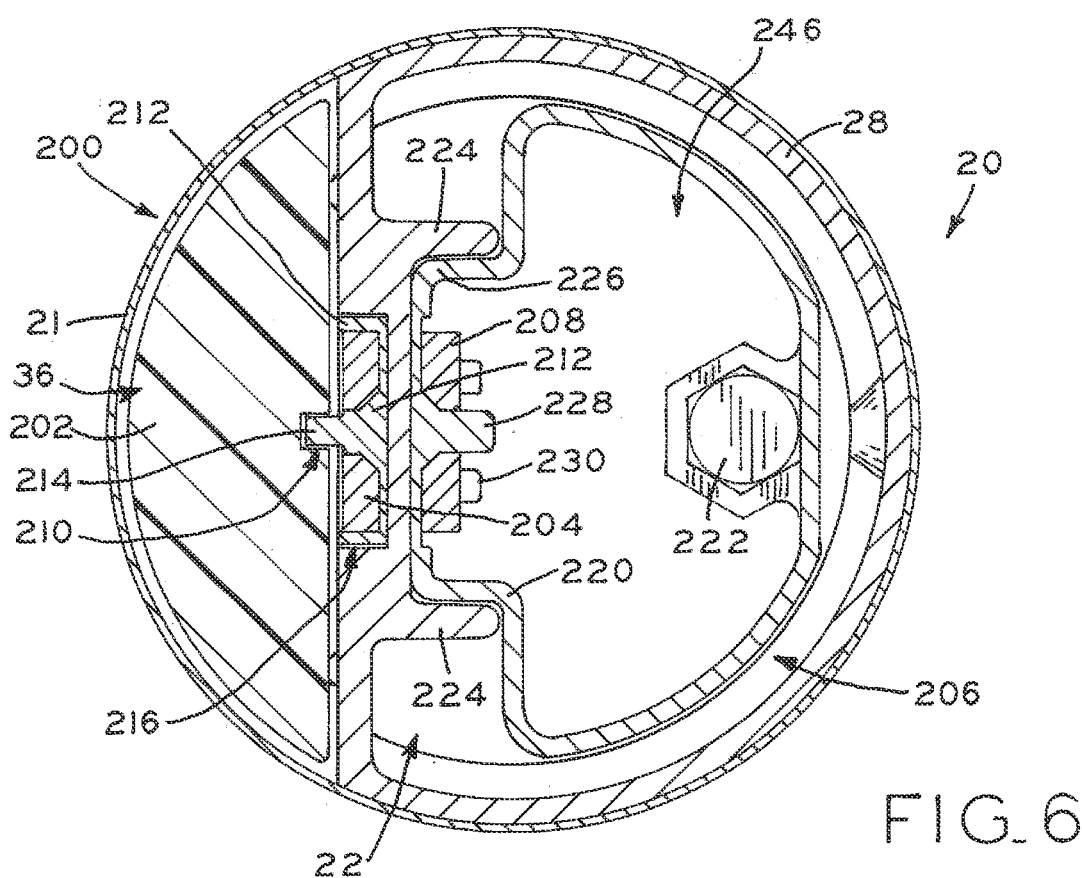
FIG. 6 is a cross-sectional, plan view of the drop tube segment and test probe taken along the line VI-VI of FIG. 5, illustrating a keying of the test probe to a desired rotational position.

Test probe 206 can be used to toggle magnet 204 and, therefore, float 36 between their respective lowered and raised positions. As best illustrated by FIG. 2, test probe 206 includes an elongate rigid rod 218 (made, e.g., of metal or a rigid polymer), a distal end of which is affixed to the periphery of distal bracket 220 by fastener 222. Rod 218 spans a length sufficient to allow the proximal end of rod 218 to be accessible by the user of test probe 206 when distal bracket 220 is seated in its test position, as further described below. As best seen in FIGS. 2 and 6, distal bracket 220 defines a non-round cross-sectional geometry (e.g., a mushroom shape as illustrated) defined by its outer periphery. This non-round shape is sized to interfit with a correspondingly non-round cross-sectional conduit geometry defined by conduit wall 28 in the vicinity of test mechanism 200. In particular, conduit wall 28 includes a pair of protrusions 224 extending radially inwardly and spaced apart to accommodate the side walls of magnet carrying portion 226 of distal bracket 220 (i.e., the stem of the mushroom shape) with a low clearance. As a result of this interfitting arrangement, best shown in FIG. 6, test probe 206 can be said to be "keyed" to fit within conduit 22 in only one rotational position.

With distal bracket 220 keyed to this rotational position, interior magnet 208 can be lowered into adjacency with exterior magnet 204. As best seen in FIG. 2, interior magnet 208 is attached to distal bracket 220 via magnet spindle 228, which receives and locates magnet 208 with respect to bracket 220, and is axially retained upon spindle 228 by a plurality of clips 230. Magnets 204, 208 have opposite polarity, so this adjacency creates a force transferring relationship between magnets 204, 208. The tolerable distance between magnets 204, 208 is a function of magnet strength, the weight of float 36 and magnet 204, and local frictional interactions. In an exemplary embodiment, the keyed rotational alignment of distal bracket 220 ensures that, when aligned, magnets 204, 208 are only separated by the material of bracket 220, the adjacent portion of conduit wall 28, and magnet carriage 212. In one exemplary embodiment, magnets 204 and 208 may be rare-earth magnets separated by less than one inch such that the magnetic attraction force therebetween is sufficiently strong to overcome the weight of float 36, magnet 204 and carriage 212, as well as any local friction forces.

In use, test probe 206 can be inserted by an operator into conduit 22 via a proximal, inlet end 80 of riser pipe 100. Distal bracket 220 is lowered along a downstream direction through conduit 22, and into the bore of drop tube segment 20. At this point, if distal bracket 220 is rotationally misaligned with the shape of the bore of conduit 22 in the vicinity of test mechanism 200, the user may rotate distal bracket 220 by rotating rod 218 until such alignment is achieved, which will be evident by distal bracket 220 being able to advance further downstream.

Distal stop 232 extends radially into conduit 22 at a position just downstream of exterior magnet 204. As distal bracket 220 is lowered to its lowered position, it encounters distal stop 232 to prevent any further downstream travel of test probe 206 as shown in FIG. 3. In this test position, interior magnet 208 is adjacent exterior magnet 204 and in a maximum force transferring relationship, such that upward movement of interior magnet 208 will also move magnet 204 and carriage 212 upwardly.

With distal bracket 220 in the lowered position, a test of the function of valve 34 may be performed by advancing test probe 206 upwardly (e.g., by the user positioned at inlet 80). As this upstream advancement occurs through its full test stroke, the attraction of exterior and interior magnets 204, 208 causes exterior magnet 204 to be drawn upwardly together with interior magnet 208. As exterior magnet 204 is brought upwardly within wall slot 216, protrusion 214 engages the upper end of float slot 210, provided that float 36 is in its lower position as shown in FIG. 3 (i.e., the fuel level within storage tank 94 is not completely filled or overfilled). When so engaged and as upward advancement of interior magnet 208 continues, test probe 206 is moved from its lowered, service position (FIG. 3) to a raised, testing position (FIG. 4).

When distal bracket 220 is in the lowered position, valve 34 can be expected to operate according to its function during regular service of the fueling system as described in detail above. However, in the test position, float 36 is retained in its raised, overfill-prevention position as long as exterior magnet 204 is maintained at the upper (i.e., upstream) end of wall slot 216 as shown in FIG. 4. With float 36 in this raised position, non-contact valve actuator 37 is elevated such that magnets 42, 44 become aligned. This alignment repels magnet 44 and pivots valve body 108 toward the closed position. Although FIG. 4 illustrates valve 34 in the fully closed position, it is appreciated that alignment of magnets 42, 44 may not fully close valve 34 but rather advance valve body 108 to an intermediate position as described above. Whether partially or fully closed, the operation of valve 34 can be verified by actuation thereof when interior and exterior magnets 208, 204 are in the test position.

Thus, by advancing test probe 206 in an upstream direction, valve 34 can be made to dislodge from its fully opened position without the presence of a filled or overfilled condition within storage tank 94. If such dislodging is observed, the overfill prevention system passes the test, whereas if valve 34 fails to dislodge from its open position, the overfill prevention system can be said to have failed the test and the cause of such failure can be further investigated. To aid in observation of valve 34 during the testing procedure, distal bracket 220 includes a hollow sidewall defining a large central opening 246 (FIGS. 2-8) through which valve body 108 can be seen toggling between its open and closed positions. In the exemplary illustrated embodiment, rod 218 and magnet 208 both attach along the periphery of bracket 220 at mutually opposite lateral locations (i.e., 180 degrees apart), such that the operator can look down the middle of conduit 22 through opening 246 to observe the status and/or function of valve 34. This "visual verification" feature enables the placement of test mechanism 200 upstream of valve 34, as described herein, such that spatial conflict between valve body 108 and rod 218 is avoided while leaving the operator's view of valve body 108 unobstructed. Positioning rod 218 so that, in use, it is opposite the hinge about which valve body 108 rotates further facilitates such visual verification.

Figure 7:
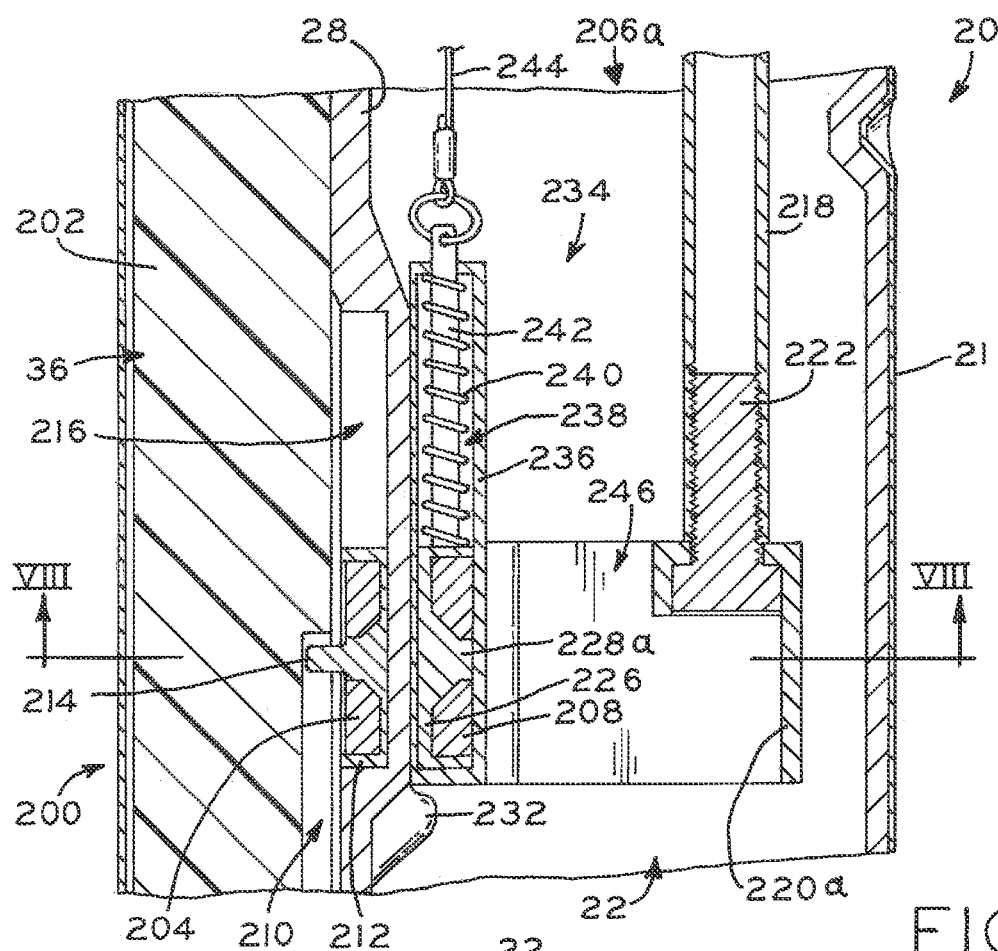
FIG. 7 is a partial cross-section, elevation view of a portion of the drop tube segment of FIG. 3, illustrating the distal end of an alternative test probe made in accordance with the present disclosure.
Figure 8:
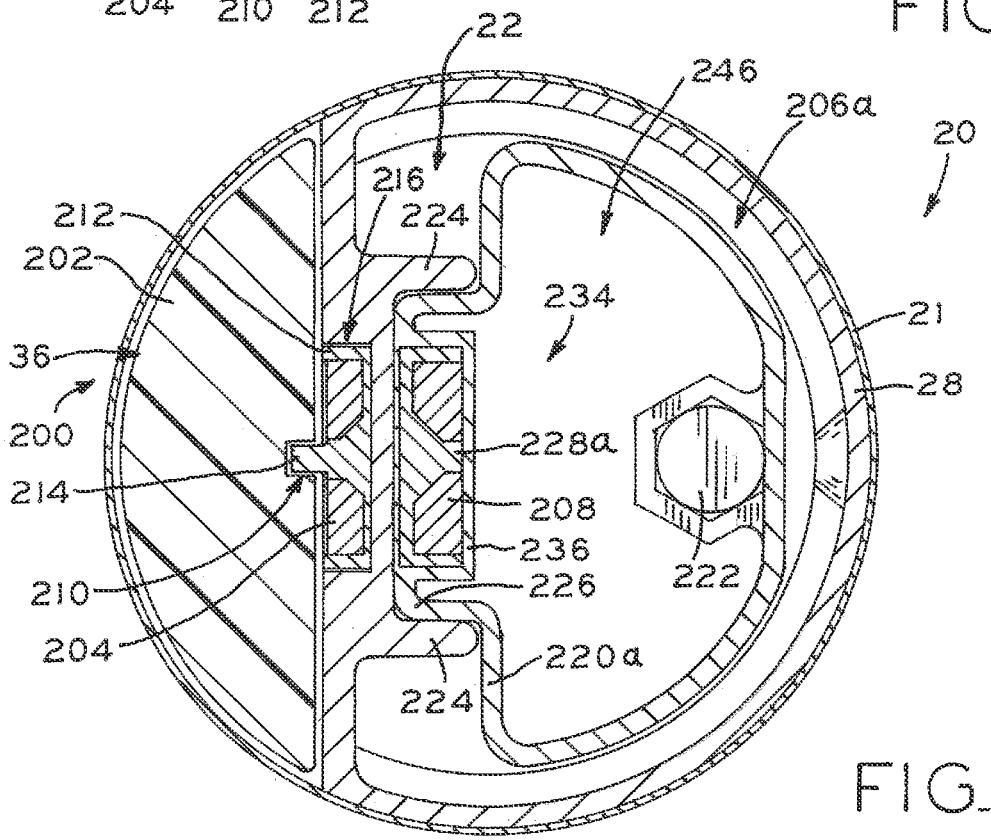
FIG. 8 is a cross-sectional, plan view of the drop tube segment and test probe taken along the line VIII-VIII of FIG. 7, illustrating a keying of the test probe to a desired rotational position.

Turning now to FIGS. 7 and 8, an alternative embodiment of test probe 206*a* including a toggle mechanism, in the form of magnet actuator 234, is illustrated. Test probe 206*a* is identical to test probe 206, with analogous parts having reference numerals corresponding to the reference numerals of test probe 206*a*, except with "a" appended thereto. Moreover, test probe 206*a* has substantially the same the parts and functionality of test probe 206, with the added feature of magnet actuator 234 as further described below.

Test probe 206*a* is placed into its lowered and seated position against stop 232 in the same manner as noted above, thereby placing magnets 204, 208 in force transferring relationship as illustrated. However, rather than lifting the entirety of test probe 206*a* to raise magnet 208 and actuate test mechanism 200, distal bracket 220*a* and rod 218 can remain in their seated positions while magnet actuator 234 is actuated to lift magnet 208.

Specifically, test probe 206*a* includes magnet carriage 228*a* in lieu of spindle 228 and clips 230. In an exemplary embodiment, magnet carriage 228*a* is formed in a similar fashion to magnet carriage 212 for exterior magnet 204, except without protrusion 214. Carriage 228*a* is, in turn, received within slider housing 236, which may be integrally formed as a part of distal bracket 220*a* or may be coupled thereto. Slider housing 236 defines slider track 238 having biasing element (e.g., spring) 240 captured therein. Actuator rod 242 is fixed to carriage 228*a* and/or magnet 208, and extends into slider track 238 and through spring 240. When rod 242 is moved upwardly, e.g. by pulling on cable 244 (which may extend up through conduit 22 to proximal inlet end 80 of riser pipe 100 for access by the operator), carriage 228a and magnet 208 are drawn upwardly with rod 242 against the biasing force provided by compression of spring 240. As magnet 208 moves through the full test stroke, magnet 204 is brought with it as a result of the force transferring relationship therebetween, as described in detail above. This raises test actuator 202, provided it started from its lowered position, and places test mechanism 200 in its raised, test configuration as also described above.

When the force on cable 244 is released, spring 240 decompresses to push carriage 228a and magnet 208 back to their lowered positions (as shown in FIG. 7). This brings magnet 204 back down, in turn allowing test actuator 202 to lower back to its lowered positions (again, provided that the fluid level in storage tank 94 does not independently maintain float 36 in its raised position).

Thus, magnet actuator 234 allows the operator to toggle test mechanism 200 between its service and test positions, without having to lift the entire test probe 206 away from its seated position. This facilitates performance of the test function by the operator, while still allowing the operator to move magnets 204, 208 through their entire ranges of motion to provide for a full and complete test of valve 34.

Non-contact test mechanism 200 as described herein does not require formation of any leak path or other aperture in conduit wall 28, such that conduit wall 28 forms an effective and complete vapor and fluid barrier to prevent exchange of fluids between the inside and outside of conduit 22. In an exemplary embodiment, non-contact test mechanism 200 is mated with a valve that also obviates the need for a leak path, e.g., valve 34 or another non-contact valve as described in further detail below. Thus, the entire valve system may be provided such that leak paths are avoided throughout the axial extent of drop tube segment 20.

3. Non-Contact Overfill Prevention Valve

As noted above, non-contact valve 34 is illustrated in schematic form for simplicity in describing the basic function of non-contact valve 34 as it relates to test mechanism 200. However, as also noted above, it is contemplated that test mechanism 200 can be used with a variety of non-contact valve actuation systems. Moreover, test actuator 202 may be linked to any other actuator for the downstream valve 34, or may integrally formed as float 36 that is linked in any suitable way to a fluid control valve such that actuation of test mechanism 200 also actuates the fluid control valve to provide the test functionality.

The following is a description of one particular exemplary fluid control valve useable in conjunction with test mechanism 200. As described in detail below, drop tube segment 60g (FIG. 9) includes a valve mechanism actuated by movement of float 76g (FIGS. 9 and 10), which may be monolithically formed with test actuator 202 to form float 36. Thus, as float 36 is moved upwardly by activation of test mechanism 200, float 76g may also be moved upwardly to simulate a rising fluid level within storage tank 94, which in turn urges flapper valve 304g (FIG. 10) toward a closed position.

FIGS. 9-21 illustrate this particular exemplary embodiment of a non-contact valve useable with test mechanism 200. The mechanism for actuating the closure of the two interior valves of this embodiment is float 76g, which is analogous in structure and function to float 36 (and, more particularly, to valve actuator 37 forming a part of float 36) described above.

Float 76g is connected to magnetic coupler 314g via link 303g and lever arm 302g. Magnetic coupler 314g is rotatably connected to the exterior of drop tube segment 60g by a central pivot and bearing as illustrated in FIGS. 9 and 10. Magnetic coupler 314g rotates about an axis transverse to a longitudinal axis of the fluid path through drop tube segment 60g. Two interior valves transition from an open to a closed position as the liquid level in tank 94 (shown in FIG. 1) rises past a certain threshold, as described above. This embodiment uses a rotational magnetic shaft coupling to transition flapper valve 304g from an open position to a closed position. The closure of flapper valve 304g is followed by the closure of closure stop 306g (shown in the open position in FIG. 20, and in the closed position in FIG. 21), which comprises a spring-biased plunger.

Referring to FIG. 9, outer magnetic coupler 314g is illustrated having four magnets 317g in a square configuration. As described above, outer magnetic coupler 314g is rotatably supported on an exterior of drop tube segment 60g. Specifically, outer magnetic coupler 314g is rotatably supported by a central pivot spaced a distance from each magnet 317g, so that rotation of outer magnetic coupler 314g causes rotation of magnets 317g about the central pivot supporting outer magnetic coupler 314g. Inner magnetic coupler 316g is similar to outer magnetic coupler 314g in that inner magnetic coupler 316g has four magnets that correspond in size and spacing to magnets 317g, which are arranged in a square configuration. Similar to outer magnetic coupler 314g, inner magnetic coupler 316g is rotatably supported relative to drop tube segment 60g. Specifically, as illustrated in FIG. 10, inner magnetic coupler 316g is rotatably supported by a central pivot spaced a distance from each of the magnets associated with inner magnetic coupler 316g, so that rotation of inner magnetic coupler 316g causes rotation of the associated magnets about the central pivots supporting inner magnetic coupler 316g, without requiring a physical penetration through the outlet wall. As illustrated in FIG. 10, bearings may be interposed between the central pivots supporting outer magnetic coupler 314g and inner magnetic coupler 316g.

Specifically, the polarity of the magnets of both outer magnetic coupler 314g and inner magnetic coupler 316g is configured such that movement of outer magnetic coupler 314g outside of fluid conduit 62g yields corresponding rotational movement of inner magnetic coupler 316g on the interior of conduit 62g, utilizing the principles of a magnetic shaft coupler. Lever arm 302g, which extends from outer magnetic coupler 314g, is pivotally connected to link 303g. Link 303g is pivotally connected to float 76g. Thus, when the liquid level in tank 94 (FIG. 1) rises, link 303g pulls lever arm 302g to rotate both outer magnetic coupler 314g and inner magnetic coupler 316g. Because outer magnetic coupler 314g is in a square configuration, link 303g has a stepped configuration so that when float 76g rises and outer magnetic coupler 314g rotates, link 303g and float 76g will not interfere with one another.

Referring to FIG. 10, both flapper valve 304g and closure stop 306g are shown in the open position. When flapper valve 304g is in the open position, it is biased upright by torsion spring 128g and held there by overhead latch 308g. Specifically, FIG. 11 shows overhead latch 308g holding flapper valve 304g in the upright position. Closure stop 306g is biased in the open position by spring 311g, which surrounds the cylindrical body of closure stop 306g and is interposed between the flanged head of closure stop 306g and a guide positioned about the perimeter of closure stop 306g to guide reciprocation of closure stop 306g. Spring 311g biases closure stop 306g such that it remains above the valve seat of leak drain 307g, leaving leak drain 307g open. In this embodiment, the biasing force of spring 311g against plunger 306g acts as a closure stop, preventing closure of the conduit at a flow level below the "leak" flow rate.

As alluded to above, this "leak" flow rate allows the column of fuel upstream of valve 34 in drop tube 98 to slowly leak past flapper valve 304g, which in turn allows fill hose 104 to drain so that it can be properly disconnected from the fill port connected to underground storage tank 94. Flapper valve 304g is said to be in a "closed" position when it disallows passage of fluid at the maximum fill rate associated with underground storage tank 94. In such a position, a small amount of flow past flapper valve 304g may be allowed as described above. In embodiments of the present disclosure, the "leak" flow rate will be about 10% (or less) of the maximum rated flow discussed above. For example, a valve having maximum rated flow of 400 gpm will have a leak flow rate of 40 gpm or less. Any time this document refers to a leak flow rate or a leak condition, such reference is to a flow rate of about 10% or less of the maximum rated flow of the conduit.

Even if the "leak" flow is eliminated, as described herein, a "drain" rate of about 2% or less of the maximum flow rate may still be allowed to pass the valve bodies of certain embodiments of the present disclosure. In some embodiments, the "drain" rate may be about 0.66 GPM or less. Similarly, any time a "drain" flow rate is mentioned in this document, it signifies a flow rate of about 2% or less of the maximum flow rate.

Figure 12:
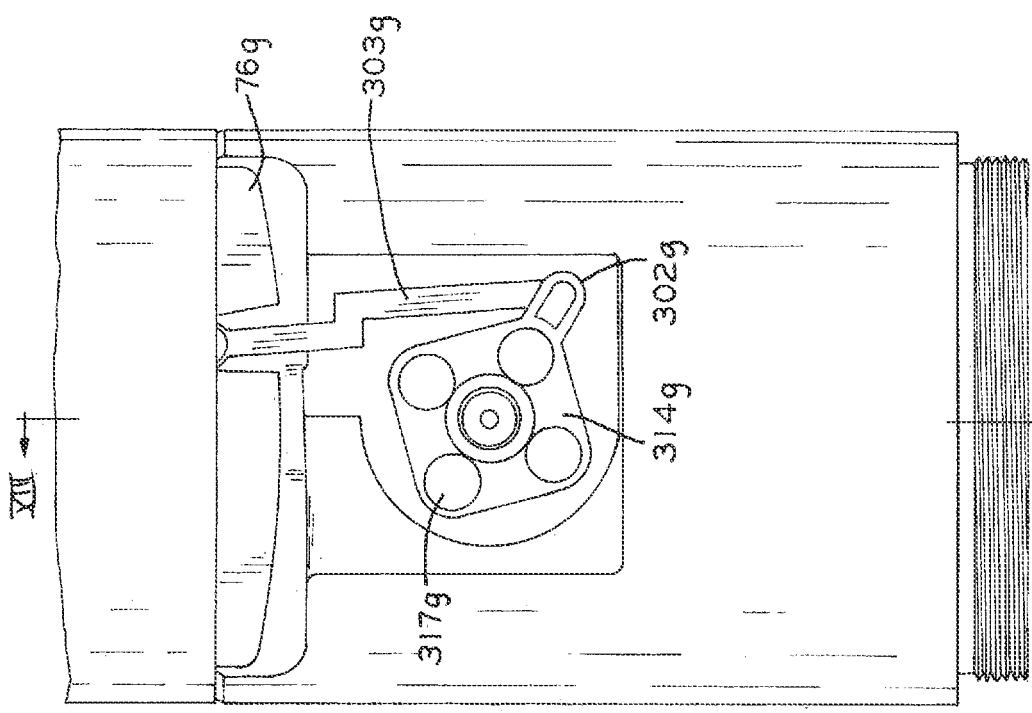
FIG. 12 is a partial radial elevational view of the drop tube segment illustrated in FIG. 9, showing movement of the non-contact valve actuator from the position illustrated in FIG. 9.

Referring now to FIG. 12, once the liquid level in tank 94 reaches a certain level, as in previous embodiments, float 76g begins to rise, and as previously described, this rising causes the rotation of both outer magnetic coupler 314g and inner magnetic coupler 316g. Once inner magnetic coupler 316g starts to rotate, first cammed surface 318g (shown, e.g., in the partial perspective view of FIG. 19), located along the inwardly facing surface of inner magnetic coupler 316g, also rotates to actuate or push overhead latch 308g out of latching configuration with flapper valve 304g.

Figure 13:
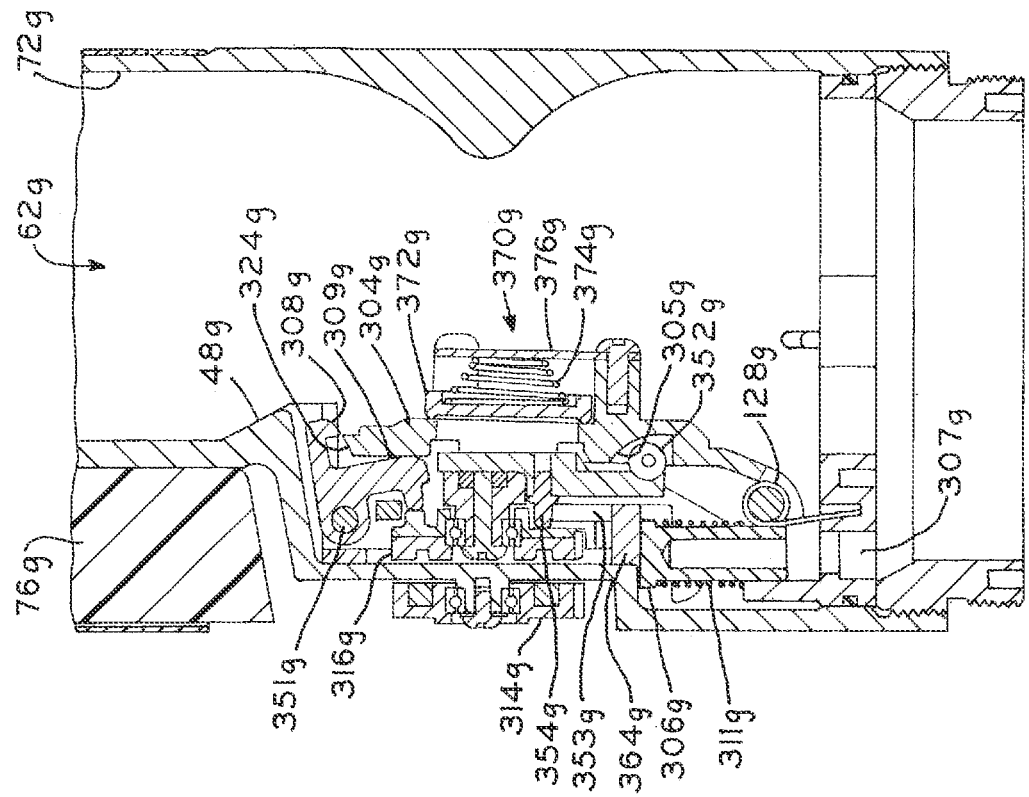
FIG. 13 is a sectional view of the drop tube segment illustrated in FIG. 12, taken along line XIII-XIII of FIG. 12, illustrating actuation of the flapper valve from an open position toward a closed position corresponding to the actuated position of the non-contact valve actuator shown in FIG. 12.

FIG. 13 shows latch 308g pivotally connected by pivot pin 351g to conduit wall interior surface 72g so that when inner magnetic coupler 316g rotates, latch 308g will ride along first cammed surface 318g. In FIG. 13, cammed surface 318g has rotated latch 308g about pivot pin 351g out of latching engagement with flapper valve 304g, i.e., to a position in which latch 308g no longer engages flapper valve 304g to hold it in the open position. Moreover, during this disengagement from latching configuration, foot 309g pushes flapper valve 304g toward the liquid stream and toward a closed position. In one exemplification in accordance with the present disclosure, foot 309g sufficiently places flapper valve 304g in the fluid stream such that the fluid stream causes closing of flapper valve 304g. In alternative embodiments, a second actuator may further position flapper valve 304g in the fluid stream.

Figure 15:
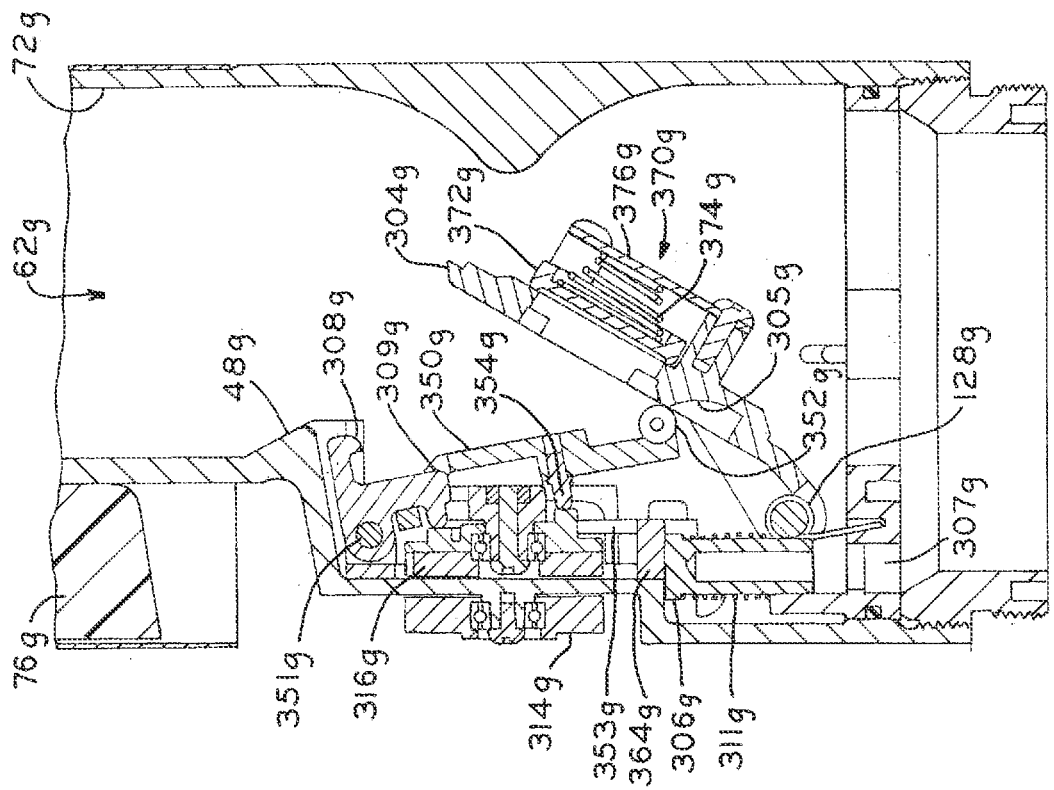
FIG. 15 is a sectional view of the drop tube segment illustrated in FIG. 14, taken along line XV-XV of FIG. 14, illustrating actuation of the flapper valve from an open position toward a closed position, corresponding to the actuated position of the non-contact valve actuator shown in FIG. 14.

Referring to FIGS. 15 and 19a, a second actuator, pivoting bracket 350g, further articulates flapper valve 304g toward the closed position. At its proximal end, pivoting bracket 350g is rotatably supported by pivot pin 351g, which also rotatably supports latch 308g and fits into pin slot 355g of bracket support 353g (which is secured relative to drop tube segment 60g). At its distal end, pivoting bracket 350g includes low-friction roller 352g. Pivoting bracket 350g interfits with bracket support 353g when pivoting bracket 350g is in the closed position, as illustrated in FIG. 10. Bracket support 353g buffers pivoting bracket 350g and inner magnetic coupler 316g so that the interaction between inner magnetic coupler 316g and pivoting bracket 350g, as inner magnetic coupler 316g rotates, is the engagement of cammed surface 320g with bracket projection 354g, as will be described below.

Cammed surface 320g (shown, e.g., in FIG. 19), located along the inwardly facing surface of inner magnetic coupler 316g, rotates in response to rotation of outer magnetic coupler 314g to actuate pivoting bracket 350g, which pivots on pivot pin 351g, from its upright position (shown, e.g., in FIG. 13) so that low-friction roller 352g can push outwardly on flapper valve 304g to further rotate flapper valve 304g into the fluid stream. Specifically, pivot pin 351g pivotally couples pivoting bracket 350g to the conduit wall interior surface 72g. As inner magnetic coupler 316g rotates from the position illustrated in FIGS. 12 and 13 to the position illustrated in FIGS. 14 and 15, bracket projection 354g (which is fixably secured to pivoting bracket 350g, or integral therewith) slides along the sloped surface of second cammed surface 320g to rotate pivoting bracket 350g about pivot pin 351g so that low friction roller 352g engages ramp surface 305g on flapper valve 304g. Roller 352g rolls along ramped surface 305g on the upper surface of flapper valve 304g as the valve actuating mechanism is moved from the position illustrated in FIGS. 12 and 13 to the position illustrated in FIGS. 14 and 15 to create an actuating force that pushes flapper valve 304g farther into the liquid stream to assist with movement of flapper valve 304g from the open to the closed position illustrated, e.g., in FIG. 16.

Referring to FIG. 15, roller 352g and flapper valve 304g are shown just prior to termination of the contact between both components as flapper valve 304g continues downward and away from roller 352g under the force of flow through conduit 62g. In other words, roller 352g, like overhead latch 308g described above, contacts to push flapper valve 304g only through part of movement of first flapper valve from the open position to the closed position. In this embodiment, both overhead latch 308g and pivoting bracket 350g are designed to be positioned very close to (potentially even in contact with) flapper valve 34g when flapper valve 304g is in the open position. Because this embodiment of the present disclosure does not rely on a mechanical linkage to actuate the internal valve, but rather relies on the fluid stream to complete actuation of the valve body, the internal actuators (in this embodiment, overhead latch 308g and pivoting bracket 350g) are spaced a greater distance from the valve body when the valve body maintains the closed position than they are when the valve body maintains the open position. Roller 352g can be constructed of a non-magnetic bearing having a low coefficient of friction.

Latch 308g is disengaged to unlatch flapper valve 304g and flapper valve 304g is subsequently pushed by foot 309g and thereafter roller 352g. The disengagement and pushing of flapper valve 304g helps pivot flapper valve 304g into the fluid stream, as described above, and as shown in the progression from FIGS. 12-17. The position illustrated in FIG. 16 corresponds to the leak position. In this position, the closure stop (in the form of plunger 306g) maintains an open position such that flow is allowed past flapper valve 304g and the drop tube segment maintains the "leak" condition defined above.

Referring to FIG. 16, even though flapper valve 304g is closed, spring 311g still biases closure stop 306g to the open position because spring 311g is strong enough to overcome the maximum head pressure in conduit 62g caused when flapper valve 304g is closed and keep closure stop 306g positioned above leak drain 307g. To actuate the closure of closure stop 306g from the open to the closed position, float 76g must rise beyond the height illustrated in FIG. 16 so that it can rotate both outer magnetic coupler 314g and inner magnetic coupler 316g farther.

Figure 21:
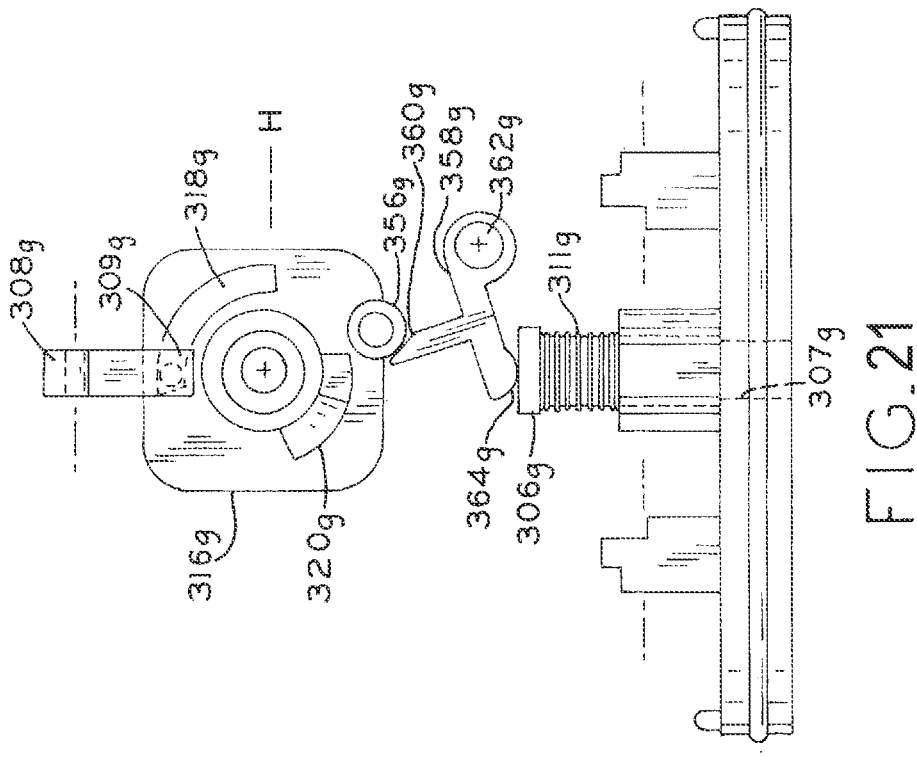
FIGS. 20 and 21 are radial elevational views of the structures illustrated in FIG. 19 illustrated prior to actuation and after full actuation, respectively.
Figure 20:
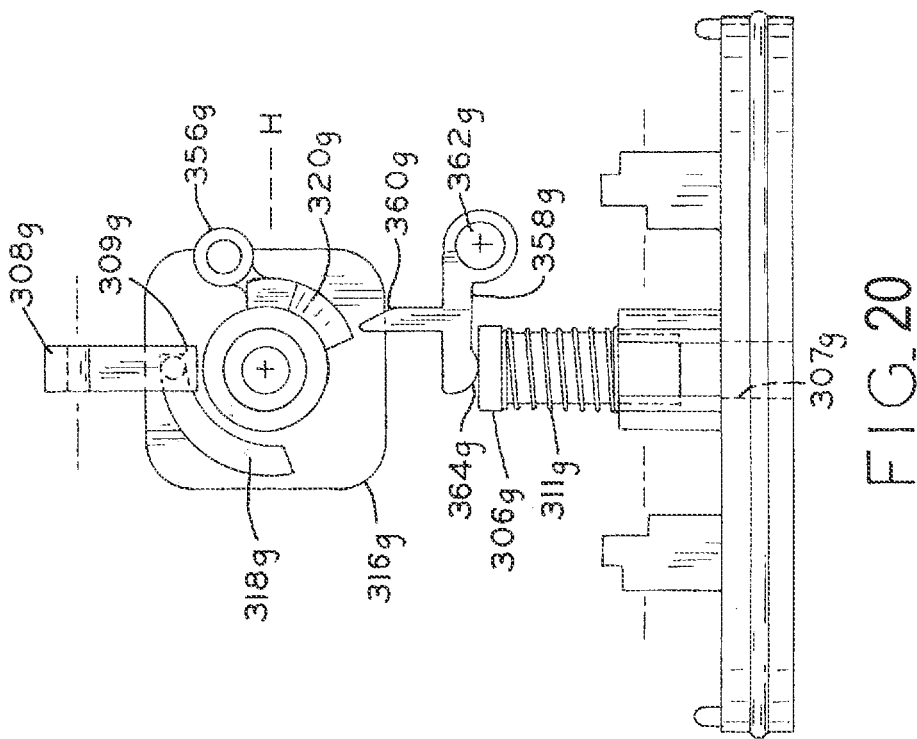

As flapper valve 304g has transitioned closed, nubbin 356g, which projects perimetrically outwardly from inner magnetic coupler 316g to define a cam, has rotated from a position above the horizontal dotted line H (FIG. 20) to a vertically downward position below dotted line H. Once the liquid level rises enough to lift float 76g farther, the resulting additional rotation of inner magnetic coupler 316g rotates nubbin 356g into contact with angled tongue 360g of cross actuator 358g. Cross actuator 358g pivots about post 362g from the position illustrated in FIG. 20 toward the position illustrated in FIG. 21. A stop surface extending from conduit wall interior surface 72g limits counterclockwise rotation (from the perspective of FIGS. 20 and 21) of cross actuator 358g beyond the position illustrated in FIG. 20. Stated another way, the stop surface precludes counterclockwise rotation of cross actuator 358g from the position illustrated in FIG. 20. Such limit on the rotation of cross actuator 358g also limits upward travel of closure stop 306g. Rotation of inner magnetic coupler 316g from the position illustrated in FIG. 20 toward the position illustrated in FIG. 21 causes nubbin 356g to rotate angled tongue 360g from the position illustrated in FIG. 20 to the position illustrated in FIG. 21. The force with which nubbin 356g rotates angled tongue 360g moves driver 364g, giving it a downward force sufficient to overcome the upward bias of spring 311g to seat closure stop 306g downward onto the valve seat provided about leak drain 307g, as illustrated in FIG. 21. With both flapper valve 304g and closure stop 306g positioned in their closed positions, flow at a "drain" rate, as described above may continue to pass through drop tube segment 60g. If desired, the "drain" rate may be achieved by designing an imperfect seating of one or more valves of a drop tube segment of the present disclosure such that even with the valves in a closed position, flow may pass thereby at the "drain" rate of about 2% or less of the maximum flow rate.

In one exemplary embodiment, float 76g will actuate closure of closure stop 306g when underground storage tank 94 is 95% full. As fluid is drawn out of tank 94 (FIG. 1) by fuel dispenser 106, float 76g will begin to descend, thereby rotating outer magnetic coupler 314g to rotate inner magnetic coupler 316g so that nubbin 356g is pivoted out of engagement with angled tongue 360g. Without nubbin 356g pressing against angled tongue 360g, spring 311g will bias closure stop 306g upward to the open position and away from the valve seat surrounding leak drain 307g.

Figure 14:
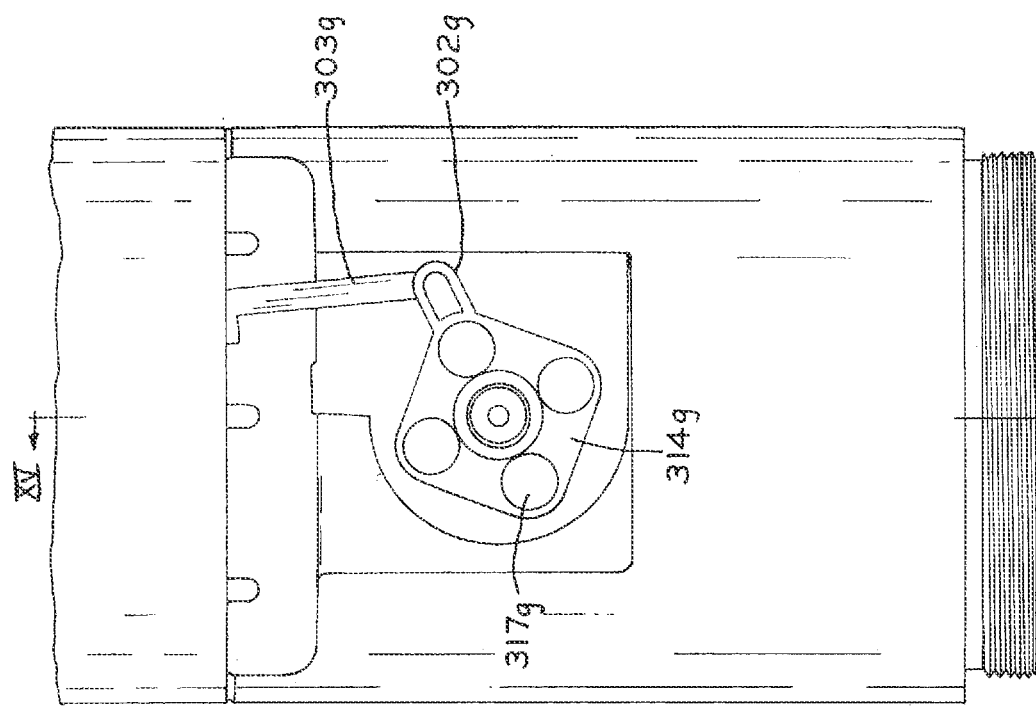
FIG. 14 is a partial radial elevational view of the drop tube segment illustrated in FIG. 9, showing movement of the non-contact valve actuator from the position illustrated in FIG. 12.

As fluid flows through conduit 62g at either the "drain" or "leak" rate described above, torsion spring 128g will return flapper valve 304g to the open position. Specifically, as the column of fluid positioned above flapper valve 304g is depleted, it will no longer provide a sufficient force to overcome the biasing force of spring 128g. If the column of fluid is no longer sufficient to overcome the biasing force of torsion spring 128g, flapper valve 304g will rotate toward its open position. If the level of fuel in underground storage tank 94 maintains a level at or above the level necessary to position the valve actuation structure as illustrated in FIGS. 14 and 15, then flapper valve 304g will return to the position illustrated in FIG. 15. If the level of fluid in underground storage tank 94 has been sufficiently depleted such that float 76g achieves its lowermost position, as illustrated, e.g., in FIGS. 9 and 10, then torsion spring 128g will actuate flapper valve 304g toward its fully open position, as illustrated in FIG. 10. If such biasing occurs with pivoting bracket 350g in its upright position, as illustrated, e.g., in FIGS. 10 and 13 and with float 76g returned to its fully lowered position, as illustrated in FIG. 9, then overhead latch 308g will no longer be rotated outwardly as illustrated in FIG. 13, but rather will maintain a position illustrated in FIG. 10. In this position, ramped end 324g (FIG. 13) of flapper valve 304g can ride along the radiused outer profile of overhead latch 308g to effect a minor counterclockwise rotation of latch 308g (with respect to the perspective of FIG. 13), such that ramped end 324g of flapper valve 304g can be secured by latch 308g as illustrated in FIG. 10.

Figure 18:
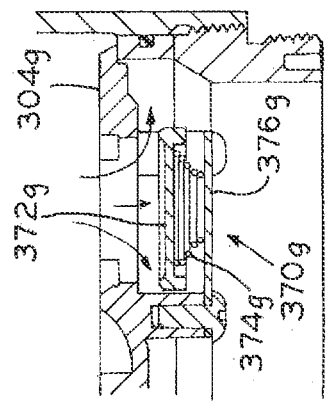
FIG. 18 is a partial sectional view of a pressure spike relief valve of the present disclosure.
Figure 17:
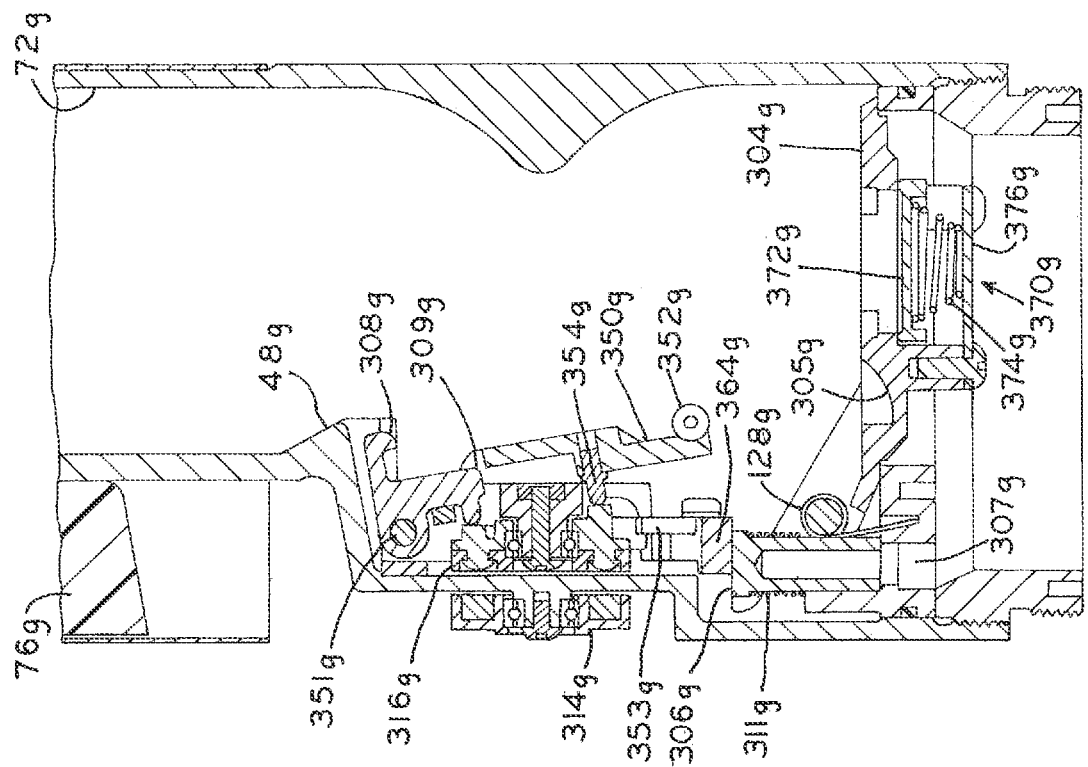
FIG. 17 is a sectional view of the drop tube segment illustrated in FIG. 9, taken along line XV-XV of FIG. 14 and illustrating the valve body in the closed position and the closure stop in the non-leak position.

Rapid closure of flapper valve 304g can cause a pressure spike in conduit 62g through a phenomenon known as "water hammer." In the event of such a phenomenon pressure spike relief valve 370g (FIG. 18) opens to relieve pressure in conduit 62g when the pressure of the flow spikes above a set value beyond the pressure typically associated with static head in conduit 62g. Referring to FIGS. 17 and 18, pressure spike relief valve 370g includes disk 372g positioned atop base platform 376g, with spring 374g interposed therebetween. Referring, e.g., to FIGS. 10 and 62, base platform 376g includes a generally triangular outer perimeter and receives three bolts generally positioned at the apices thereof to secure base platform 376g to the undersurface of flapper valve 304g. As illustrated in FIG. 17, spring 374g acts against base platform 376g to bias disk 372g into a closed position relative to an opening through flapper valve 304g. Spring 374g has a spring constant that correlates to the typical static head pressure achieved when the drop tube segment upstream of drop tube segment 60g (and, in certain cases, hose 104 connected thereto) are filled with fluid after closing of flapper valve 304g, so that pressure spike relief valve 370g opens when the flow pressure spikes above such static head. Specifically, such a pressure spike causes disk 372g to unseat from its closed position, as illustrated in FIG. 17 toward an open position illustrated in FIG. 18 to allow a flow of fluid through flapper valve 304g, thereby decreasing pressure in conduit 62g. As long as the pressure of the liquid in conduit 62g is sufficiently high to counteract the biasing force of spring 374g, disk 372g will remain open to limit both the amplitude and duration of high pressure exposure to conduit 62g. For example, in one exemplary embodiment, the pressure spike relief valve ensures that pressure in conduit 62g does not exceed 43.5 psi for over 10 milliseconds. In an alternative embodiment, the pressure spike relief valve may be hinged at one side so that it moves between the open and closed positions in the manner of a flapper valve, as opposed to the moveable disc arrangement shown in FIGS. 17 and 18.

As described above, the overfill prevention valve in accordance with the present disclosure can include a valve actuator means for actuating a valve body from an open position to a closed position while the valve actuator means is positioned outside of the fluid path and without requiring a physical penetration of the wall defining the fluid path. Exemplary embodiments of the valve actuator means include the various float/magnet/actuator combinations described above and any combination of the features of the various float/magnet/actuator combinations described above.

Further, an overfill prevention valve in accordance with the present disclosure can include a leak means for selectively allowing a quantity of fluid to leak past a valve body when the valve body is in the closed position. Leak actuator means for actuating the leak means from a non-leak position in which the leak means does not allow the quantity of fluid to leak past the valve body to a leaked position in which the leak means allows the quantity of fluid to leak past the valve body include the various float/magnet/actuator combinations described above. The leak means may take the form of a closure stop which prevents full seating of the valve body in a closed position, as described above. The leak means may further take the form of a closure stop in the form of a secondary valve such as a poppet valve, flapper valve or plunger which can be unseated when the primary valve maintains a closed position.

Any of the drop tube segments including an overfill prevention valve described above can be connected at their first and second ends to the remainder of drop tube 98 by a variety of connections including, e.g., threaded connections. Threaded adapters may be utilized to effect such connections and o-rings may be provided to seal the drop tube segments of the present disclosure to the remainder of the drop tube.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method of testing an overfill prevention valve, the method comprising:
    accessing an upstream end of a conduit, the conduit having a downstream end opposite the upstream end and a valve disposed between the upstream end and the downstream end;
    advancing a distal portion of a test probe into the conduit from the upstream end toward the downstream end thereof;
    positioning the distal portion of the test probe into the conduit at a location upstream of the valve location;
    by said step of positioning the distal portion of the test probe, bringing an interior non-contact coupler fixed to the distal portion of the test probe into a force transferring relationship with an exterior non-contact coupler fixed to a non-contact test mechanism disposed outside the conduit and operably coupled to the valve, the non-contact test mechanism axially moveable along an outer surface of the conduit between a test position, in which the non-contact test mechanism urges the valve toward a closed position, and a service position, in which the non-contact test mechanism allows the valve to be placed in an open position; and
    axially moving the interior non-contact coupler to toggle the non-contact test mechanism between the test position and the service position, such that the valve is selectively moved toward the closed or open positions;
    wherein the conduit defines a non-round cross-sectional conduit geometry, and the distal portion has a non-round cross-sectional probe geometry corresponding to the conduit geometry, and
    wherein the non-round cross-sectional conduit geometry is sized and configured to prevent rotation of the distal portion of the test probe when the non-round cross-sectional probe geometry is engaged therewith.

2. The method of claim 1, wherein said step of toggling is performed by axially advancing the interior non-contact coupler through a test stroke within the conduit.

3. The method of claim 2, wherein said step of toggling is performed by moving the distal portion of the test probe through the test stroke.

4. The method of claim 2, wherein said step of toggling is performed by actuating a toggle mechanism contained within the distal portion of the test probe.

5. The method of claim 1, wherein the interior non-contact coupler and the exterior non-contact coupler are magnets of opposite polarity.

6. The method of claim 5, wherein the step of bringing the interior non-contact coupler into a force transferring relationship with an exterior non-contact coupler comprises placing the magnets into adjacency with one another.

7. The method of claim 5, wherein the magnets are rare-earth magnets separated by less than one inch when the magnets are in the adjacency with one another, such that the magnetic attraction force between the magnets is sufficiently strong to toggle the non-contact test mechanism between the test position and the service position.

8. The method of claim 1, wherein the conduit is a drop tube, and the non-contact test mechanism is a magnetically-operable valve actuator which urges the valve into the closed position blocking the fluid path through the drop tube.

9. The method of claim 1, wherein the non-round cross-sectional conduit geometry includes an arrangement of protrusions which interact with the side walls of the non-round cross-sectional probe geometry to prevent the rotation.

10. The method of claim 1, wherein the non-round cross-sectional conduit geometry is a first mushroom shape and the non-round cross-sectional probe geometry is a second mushroom shape.

11. The method of claim 1, further comprising, after the step of advancing the distal portion of the test probe into the conduit and before the step of positioning the distal portion of the test probe into the conduit:
    if the non-round cross-sectional probe geometry is misaligned with the non-round cross-sectional conduit geometry, rotating the distal portion of the test probe to align the distal portion probe geometry with the corresponding conduit geometry.

12. A method of testing an overfill prevention valve, the method comprising:
    accessing an upstream end of a conduit, the conduit having a downstream end opposite the upstream end and a valve disposed between the upstream end and the downstream end;
    advancing a distal portion of a test probe into the conduit from the upstream end toward the downstream end thereof;
    positioning the distal portion of the test probe into the conduit at a location upstream of the valve location;
    by said step of positioning the distal portion of the test probe, bringing a first magnet fixed to the distal portion of the test probe into magnetic engagement with a second magnet fixed to a test mechanism disposed outside the conduit and operably coupled to the valve, the first magnet and the second magnet having opposite polarities,
    the test mechanism axially moveable along an outer surface of the conduit between a test position, in which the test mechanism urges the valve toward a closed position, and a service position, in which the test mechanism allows the valve to be placed in an open position; and
    axially moving the first magnet while the first magnet and the second magnet are magnetically engaged to toggle the test mechanism between the test position and the service position, such that the valve is selectively moved toward the closed or open positions;

wherein the conduit is a drop tube, and the test mechanism includes a magnetically-operable valve actuator which urges the valve into the closed position blocking the fluid path through the drop tube; and wherein the magnetically-operable valve actuator of the test mechanism is spaced axially in a downstream direction from the second magnet, such that the first magnet of the distal portion of the test probe can magnetically engage with the second magnet of the test mechanism upstream of the valve location.

13. The method of claim 12, wherein the magnets are rare-earth magnets separated by less than one inch when the magnets are in magnetically engaged with one another, such that the magnetic attraction force between the magnets is sufficiently strong to toggle the test mechanism between the test position and the service position.

14. The method of claim 12, wherein:
the conduit defines a non-round cross-sectional conduit geometry, and
the distal portion has a non-round cross-sectional probe geometry corresponding to the conduit geometry.

15. The method of claim 14, wherein the non-round cross-sectional conduit geometry is sized and configured to prevent rotation of the distal portion of the test probe when the non-round cross-sectional probe geometry is engaged therewith.

16. The method of claim 15, wherein the non-round cross-sectional conduit geometry includes an arrangement of protrusions which interact with the side walls of the non-round cross-sectional probe geometry to prevent the rotation.

\* \* \* \* \*